United States Patent [19]

Hergenrother et al.

[11] 4,151,222

[45] Apr. 24, 1979

[54] AMINE TERMINATED POLYMERS AND THE FORMATION OF BLOCK COPOLYMERS

[75] Inventors: William L. Hergenrother; Richard A. Schwarz; Richard J. Ambrose, all of Akron; Robert A. Hayes, Cuyahoga Falls, all of Ohio

[73] Assignee: The Firestone Tire & Rubber Company, Akron, Ohio

[21] Appl. No.: 848,962

[22] Filed: Nov. 7, 1977

Related U.S. Application Data

[63] Continuation-in-part of Ser. No. 574,676, May 5, 1975, Pat. No. 4,070,344.

[51] Int. Cl.$^2$ .............................................. C08L 79/08
[52] U.S. Cl. ........................... 260/857 G; 260/18 PN; 260/18 PF; 260/23 EP; 260/23.7 R; 260/830 P; 260/836; 260/851; 260/852; 260/855; 260/857 D; 260/858; 260/859 R; 521/139; 521/140; 528/75
[58] Field of Search ..................... 260/77.5 CR, 857 G

[56] References Cited

U.S. PATENT DOCUMENTS

| | | |
|---|---|---|
| 3,017,392 | 1/1962 | Butler et al. ........................ 260/78 L |
| 3,135,716 | 6/1964 | Uraneck et al. ............. 260/77.5 CR |
| 3,225,119 | 12/1965 | Baker ..................... 260/874 |
| 3,281,383 | 10/1966 | Zelinski et al. ..................... 260/23.7 |
| 3,331,730 | 7/1967 | Hsieh ........................ 260/77.5 CR |
| 3,595,941 | 7/1971 | Farrah et al. ........................ 260/879 |
| 3,838,108 | 9/1974 | Hergenrother et al. ..... 260/77.5 CR |
| 3,859,382 | 1/1975 | Hergenrother et al. ........ 260/857 G |
| 3,887,643 | 6/1975 | Selman ............................ 260/857 D |

FOREIGN PATENT DOCUMENTS

| | | |
|---|---|---|
| 6612301 | 3/1967 | Netherlands. |
| 1131549 | 10/1968 | United Kingdom. |
| 1137046 | 12/1968 | United Kingdom. |

OTHER PUBLICATIONS

Mottus et al., Polymer Preprints, vol. 9(1), 390 (1968).

*Primary Examiner*—Walter C. Danison

[57] ABSTRACT

Polymers of anionically polymerized monomers such as mono-olefins, conjugated dienes, vinyl substituted aromatics, vinyl substituted pyridine, vinyl substituted quinolines, various aldehydes, various epoxides, various oxetanes, various oxygen-containing compounds, and the like are produced and end capped with a polyisocyanate or polyisothiocyanate having the formula R—(N=C=X)$_n$ wherein R is a hydrocarbon, n is 2 or 3, and X is oxygen or sulfur. Such end capped polymers, of course, contain one reacted or connected isocyanate or isothiocyanate group and at least one free isocyanate or isothiocyanate end group, which free end group(s) reacts with an amide to give an imide end group. The imide terminated polymer is then hydrolyzed to form a stable amine terminated polymer. The reaction of the amide compound with the isocyanate(s) or isothiocyanate(s), followed by hydrolysis, results in the replacement of the free isocyanate or isothiocyanate end group(s) with an amine group(s). Thus, the amine terminated polymer contains the polymer connected to an isocyanate or isothiocyanate group (now an amide group or a thioamide group), which in turn is attached to the hydrocarbon portion, that is, the "R" portion of the polyisocyanate, which in turn is connected to the formed amine group. The amine terminated polymers may be stored extended periods of time and then reacted with various polymers, prepolymers, monomers, or various combinations thereof to form various block or graft copolymers. That is, the amine terminated polymer may be subsequently reacted with any amine reactive compound such as diepoxy monomers or an epoxy prepolymer in the presence of known epoxy catalysts to give a blocked epoxy copolymer. Similarly, the amine terminated polymer may be reacted with urea prepolymers or urea-forming monomers to yield a block urea copolymer. Reaction of the amine terminated polymer with urethane polymers, urethane prepolymers, or urethane-forming monomers will yield a urethane block copolymer. Reaction of the amine terminated polymer with urethane-urea prepolymers or urethane-urea forming monomers will yield a urethane-urea block copolymer. Similarly, various dianhydride and diamine monomers may be utilized to form an imide block copolymer.

16 Claims, No Drawings

AMINE TERMINATED POLYMERS AND THE FORMATION OF BLOCK COPOLYMERS

CROSS-REFERENCE

This application is a continuation-in-part of our co-pending U.S. application bearing Ser. No. 574,676, filed May 5, 1975, now U.S. Pat. No. 4,070,344 for "AMINE TERMINATED POLYMERS AND THE FORMATION OF BLOCK COPOLYMERS".

BACKGROUND OF THE INVENTION

The present invention relates to the anionic polymerization of generally olefinic-type polymers and the termination thereof with an amine end group. More specifically, the present invention relates to the formation of amine terminated, anionically polymerizable polymers which are stable and yet can be reacted with amine reactive compounds such as monomers or polymers to form block polymers. Such block copolymers are generally easily processed in a manner typical of the anionically produced polymers such as elastomers but yet, upon cure, generally exhibit properties typical of the other constituent. A specific aspect of the present invention therrefore relates to the formation of an epoxy block copolymer. In another specific aspect, the present invention relates to the formation of a urea-formaldehyde graft copolymer. In yet another specific aspect, the present invention relates to the formation of an acetalized polyvinyl alcohol graft copolymer. In yet another specific aspect, the present invention relates to the formation of a phenol-formaldehyde graft copolymer. In yet another specific aspect, the present invention relates to the formation of a nylon block copolymer. In yet another specific aspect, the present invention relates to the formation of a urea block copolymer. In yet another specific aspect, the present invention relates to the formation of a urethane-urea block copolymer. In yet another specific aspect, the present invention relates to the formation of a urethane block copolymer. In yet another specific aspect, the present invention relates to the formation of an imide block copolymer.

The polymerization of conjugated dienes and/or vinyl substituted aromatic compounds with organo alkali metal initiators is well known in the art. The resulting alkali metal terminated polymers are often reacted with polyfunctional compounds to couple the polymers, for example, U.S. Pat. Nos. 3,135,716; 3,468,972; 3,225,119 and 3,281,383. However, none of these patents disclose the preparation of anionically polymerized polymers which contain a terminal amine. Moreover, anionic polymers used in the preparation of block copolymer having a constituent other than the initial constituent is not disclosed.

Various inventions exist which utilize amines for various purposes. For example, U.S. Pat. No. 3,017,392 relates to the formation of linear polyamides by the polymerization of lactams. The polymerization is carried out in the presence of a tertiary-nitrogen atom-containing compound and a molecular weight-regulating concentration of a primary or secondary amine. In U.S. Pat. No. 3,028,369, a polymerization of lactams is enhanced by the addition of an organic isocyanate used as an initiator or promoter. In an article by Mottus, Hendrick and Butler, Polymer Preprints, 9(1), 390(1968), it is stated that the initial polymerization of caprolactam can be controlled with use of amine modifiers to give products over a wide range of molecular weights. Primary amines are effective as modifiers with secondary amines showing less modifying action and tertiary amines being inactive. The control is hypothesized to involve chain termination and acyl transfer. However, none of these patents suggests the amine termination of an anionically polymerized polymer which may be utilized in the formation of block copolymers.

In U.S. Ser. No. 219,161, now U.S. Pat. No. 3,838,108, there is disclosed the formation of various block copolymers. However, the block copolymers disclosed in U.S. Pat. No. 3,838,108, generally had to be made in one continuous process since the anionically polymerized polymer with isocyanate or polyisocyanate end caps tended to be unstable and could not be stored for any appreciable period of time. That is, moisture or active hydrogen-containing impurities would react with the highly reactive isocyanate and prevent the formation of the desired block copolymer. Moreover, in the absence of active hydrogen compounds, trimerization or dimerization of the isocyanate or isothiocyanate may occur. The requirement of a continuous polymerization is at times uneconomical and impractical, especially when tailor-made products are desired. Moreover, another disadvantage of the continuous formation of the block copolymer is that due to various parameters involved, the precise precentage of a polyolefin-type polymer end capped by an isothiocyanate or isocyanate would vary from time to time and generally was very difficult to control or to determine immediately. Such variation tended to produce block copolymers of less than optimum and sometimes undesirable properties in situations wherein a precise stoichiometric amount of monomer or polymer was required as in the formation of a polyimide block copolymer.

Moreover, many patents have disclosed the combination of phenolic resins with rubber stocks for use as tire cord dips and/or adhesives. These patents generally depend upon the reaction of the phenolic hydroxyl for joining the two materials, for example, British Pat. Nos. 1,137,046 and 1,131,549, or use phenolic compounds which contain polymeric or oligomeric substituents, for example, Netherlands Pat. No. 6,612,301. Moreover, unusual or exotic-type catalysts are required such as a metallic cocatalyst as in British Pat. No. 1,137,046 or $BF_3$ as in Netherlands Pat. No. 6,612,301. The present invention does not require any catalyst or precautions beyond that known to the preparation of phenolic resins. Rather, the present invention generally relates to the preparation of block copolymers which are capable of being cured to give thermosetting resins which can be used as ahesives and, when mineral filled and compounded, show good flexural strength (greater than 11,000 psi) and good flexural modulus (greater than 990,000 psi), coupled with high heat distortion (230° C. at 264 psi). The graft copolymers are prepared by reacting phenol-aldehyde materials with amine terminated polymers to form the graft copolymer.

U.S. Pat. No. 3,331,730 relates to the preparation of phenolic resins esterfied with unsaturated monocarboxylic acids and laminates therefrom. Once again, a polymer is prepared through reaction of the phenolic hydroxyl groups and results in a completely different polymer.

SUMMARY OF THE INVENTION

It is, therefore, an object of the present invention to produce anionically prepared polymers which are amine terminated.

It is also an object of the present invention to produce anionically prepared polymers which are reacted with either polyisocyanates or polyisothiocyanates, further reacted with an amide compound, and then hydrolyzed to form an amine terminated polymer.

It is another object of the present invention to produce an amine terminated polymer, as above, wherein said amide compounds are lactams.

It is yet another object of the present invention to produce amine terminated polymers, as above, which may be stored for extended periods of time.

It is yet another object of the present invention to produce amine terminated polymers, as above, which may be subsequently reacted with amine reactive compounds such as monomers, oligomers, prepolymers, or polymers containing an amine reactive compound to produce graft or block copolymers.

It is yet another object of the present invention to produce amine terminated polymers, as above, which can be reacted with lactams by nylon activators to form nylon block copolymers.

It is yet another object of the present invention to produce amine terminated polymers, as above, which can be reacted with various monomers or polymers to form tailor-made block copolymers.

It is yet another object of the present invention to produce amine terminated polymers, as above, which can be reacted with a precise and accurate amount of monomers or polymers to form block copolymers of very high physical properties.

It is yet another object of the present invention to produce amine terminated polymers, as above, which can be reacted to form block copolymers in which the amine terminated portion of a block copolymer is an elastomer.

It is yet another object of the present invention to produce amine terminated polymers, as above, which can be further reacted with epoxy containing monomers or prepolymers to produce an epoxy block copolymer.

It is yet another object of the present invention to produce amine terminated polymers which can be further reacted with urea-aldehyde forming monomers or prepolymers to produce a urea-aldehyde graft copolymer.

It is yet another object of the present invention to produce amine terminated polymers which can be further reacted with urea-forming monomers or polymers to produce a urea block copolymer.

It is yet another object of the present invention to produce amine terminated polymers which can be further reacted with acetalized polyvinyl alcohol-forming monomers or polymers to produce acetalized polyvinyl alcohol copolymers.

It is yet another object of the present invention to produce amine terminated polymers which can be further reacted with phenol-aldehyde-forming monomers or prepolymers to produce phenol-aldehyde graft copolymers.

It is yet another object of the present invention to produce amine terminated polymers which can be further reacted with nylon-forming monomers or polymers to produce nylon block copolymers.

It is yet another object of the present invention to produce amine terminated polymers which can be further reacted with urethane-forming monomers, prepolymers, or polymers to produce urethane block copolymers.

It is yet another object of the present invention to produce amine terminated polymers which can be further reacted with urethane-urea-forming monomers or polymers to produce urethane-urea block polymers.

It is yet another object of the present invention to produce amine terminated polymers which can be further reacted with imide-forming monomers to produce imide block copolymers.

These and other objects of the present invention will become apparent from the following specification which describes in detail various embodiments without attempting to discuss all of the modifications in which the invention might be embodied; the invention being measured by the appended claims and not by the details of the specification.

Generally, an epoxy copolymer composition, comprises:

an amine terminated polymer connected to an epoxy polymer constituent to form the epoxy copolymer;

said amine terminated polymer being an end capped polymer formed by the reaction of an anionically prepared polymer and a single polyisocyanate or polyisothiocyanate compound so that at least one unreacted isocyanate or isothiocyanate end portion exists wherein said unreacted isocyanate or isothiocyanate end portion has been converted to an amine group;

said polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of 1. $CH_2\!=\!CACN$ wherein A is CN, $CF_3$, $CH_3$ or H;
2. $CH_2\!=\!CACO_2R$ wherein A is $CO_2R$, $SO_2R$, $CH_3$ or H;
3. $CH_2\!=\!CANO_2$ wherein A is Cl, $CH_3$ or H;
4. $CH_2\!=\!CACON(R)_2$ wherein A is $CH_3$ or H;

wherein R is a 1 to 15 carbon atom alkyl, a 4 to 15 carbon atom cycloalkyl, an aromatic, a 1 to 15 carbon atom alkyl substituted aromatic, a 4 to 15 carbon atom cycloalkyl substituted aromatic, or hydrogen;

said copolymer made from monomers of conjugated dienes and vinyl substituted aromatics;

said polyisocyanate and said polyisothiocyanate having the formula

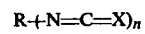

$$R\!+\!N\!=\!C\!=\!X)_n$$

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur; and said epoxy polymer constituent is selected from the class consisting of epoxidized soy bean oil, butadiene diepoxide, dicyclopentadiene diepoxide, cyclohexane oxide, epoxidized castor oil and compounds made by reacting epoxy monomers or epoxy prepolymers with hydroxyl terminated polymers.

Additionally, a process for producing a composition of an amine terminated polymer connected to an epoxy polymer, comprises the steps of:

anionically polymerizing monomers to form a polymer, said polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of 1. $CH_2=CACN$ wherein A is CN, $CF_3$, $CH_3$ or H;
2. $CH_2=CACO_2R$ wherein A is $CO_2R$, $SO_2R$, $CH_3$ or H;
3. $CH_2=CANO_2$ wherein A is Cl, $CH_3$ or H;
4. $CH_2=CACON(R)_2$ wherein A is $CH_3$ or H;

wherein R is a 1 to 15 carbon atom alkyl, a 4 to 15 carbon atom cycloalkyl, an aromatic, a 1 to 15 carbon atom alkyl substituted aromatic, a 4 to 15 carbon atom cycloalkyl substituted aromatic, or hydrogen;

said copolymer made from monomers of conjugated dienes and vinyl substituted aromatics;

reacting said anionically prepared polymer with a compound selected from the class consisting of a polyisocyanate or a polyisothiocyanate to form an end capped polymer, said polyisocyanate or said polyisothiocyanate having the formula

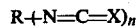

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur;

reacting an amide compound with said end capped polymer to form an imide-type terminated polymer;

hydrolyzing said imide terminated polymer to produce the primary amine terminated polymer;

reacting said amine terminated polymer with an epoxy constituent selected from the class consisting of epoxidized soy bean oil, butadiene diepoxide, dicyclopentadiene diepoxide, cyclohexene oxide, epoxidized castor oil, and compounds consisting of (a) an epoxy prepolymer made from an epoxy monomer reacted with hydroxyl terminated monomers, and (b) an epoxy monomer reacted with hydroxyl terminated monomers;

polymerizing said epoxy-forming monomers to form an epoxy polymer;

said polymer connected to said amine terminated polymer; and said hydroxyl terminated compounds selected from the class consisting of bisphenol A, resorcinol, hydroquinone, glycerol, ethylene glycol, 1,4-butane diol, 1,5-propane diol, and novalac resins derived from phenol and aldehyde.

Generally, a urea block copolymer composition, comprises:

an amine terminated polymer connected to a urea polymer constituent to form the urea block copolymer;

said amine terminated polymer being an end capped polymer formed by the reaction of an anionically prepared polymer and a single polyisocyanate or polyisothiocyanate compound so that at least one unreacted isocyanate or isothiocyanate end portion exists wherein said unreacted isocyanate or isothiocyanate end portion has been converted to an amine group;

said polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of 1. $CH_2=CACN$ wherein A is CN, $CF_3$, $CH_3$ or H;
2. $CH_2=CACO_2R$ wherein A is $CO_2R$, $SO_2R$, $CH_3$ or H;
3. $CH_2=CANO_2$ wherein A is Cl, $CH_3$ or H;
4. $CH_2=CACON(R)_2$ wherein A is $CH_3$ or H;

wherein R is a 1 to 15 carbon atom alkyl, a 4 to 15 carbon atom cycloalkyl, an aromatic, a 1 to 15 carbon atom alkyl substituted aromatic, a 4 to 15 carbon atom cycloalkyl substituted aromatic, or hydrogen;

said copolymer made from monomers of conjugated dienes and vinyl substituted aromatics;

said polyisocyanate and said polyisothiocyanate having the formula

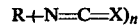

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur; and said urea polymer constituent being made from urea-forming monomers.

Additionally, a process for producing a urea block copolymer, comprises the steps of:

anionically polymerizing monomers to form a polymer, said polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of 1. $CH_2=CACN$ wherein A is CN, $CF_3$, $CH_3$ or H;
2. $CH_2=CACO_2R$ wherein A is $CO_2R$, $SO_2R$, $CH_3$ or H;
3. $CH_2=CANO_2$ wherein A is Cl, $CH_3$ or H;
4. $CH_2=CACON(R)_2$ wherein A is $CH_3$ or H;

wherein R is a 1 to 15 carbon atom alkyl, a 4 to 15 carbon atom cycloalkyl, an aromatic, a 1 to 15 carbon atom alkyl substituted aromatic, a 4 to 15 carbon atom cycloalkyl substituted aromatic, or hydrogen;

said copolymer made from monomers of conjugated dienes and vinyl substituted aromatics;

reacting said anionically prepared polymer with a compound selected from the class consisting of a polyisocyanate or a polyisothiocyanate to form an end capped polymer, said polyisocyanate or said polyisothiocyanate having the formula

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur;

reacting an amide compound with said end capped polymer to form an imide-type terminated polymer;

hydrolyzing said imide terminated polymer to produce the primary amine terminated polymer;

reacting said amine terminated polymer with a compound selected from the class consisting of (a) a urea polymer made from urea-forming monomers, and (b) urea-forming monomers; and polymerizing said urea-forming monomers to produce a urea polymer, said urea polymer connected to said amine terminated polymer to form said urea block copolymer.

Generally, a urethane block copolymer composition, comprises:

an amine terminated polymer connected to a urethane polymer constituent to form the urethane block copolymer;

said amine terminated polymer being an end capped polymer formed by the reaction of an anionically prepared polymer and a single polyisocyanate or polyisothiocyanate compound so that at least one unreacted isocyanate or isothiocyanate end portion exists wherein said unreacted isocyanate or isothiocyanate end portion has been converted to an amine group;

said polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of 1. $CH_2\!=\!CACN$ wherein A is CN, $CF_3$, $CH_3$ or H;
2. $CH_2\!=\!CACO_2R$ wherein A is $CO_2R$, $SO_2R$, $CH_3$ or H;
3. $CH_2\!=\!CANO_2$ wherein A is Cl, $CH_3$ or H;
4. $CH_2\!=\!CACON(R)_2$ wherein A is $CH_3$ or H;

wherein R is a 1 to 15 carbon atom alkyl, a 4 to 15 carbon atom cycloalkyl, an aromatic, a 1 to 15 carbon atom alkyl substituted aromatic, a 4 to 15 carbon atom cycloalkyl substituted aromatic, or hydrogen;

said copolymer made from monomers of conjugated dienes and vinyl substituted aromatics;

said polyisocyanate and said polyisothiocyanate having the formula

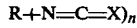

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur;

said urethane polymer constituent being the reaction product of polyhydroxy compounds having at least two hydroxyl groups and a polyisocyanate having the formula

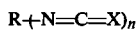

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur.

Additionally, a process for producing a urethane block copolymer, comprises the steps of:

anionically polymerizing monomers to form a polymer, said polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of 1. $CH_2\!=\!CACN$ wherein A is CN, $CF_3$, $CH_3$ or H;
2. $CH_2\!=\!CACO_2R$ wherein A is $CO_2R$, $SO_2R$, $CH_3$ or H;
3. $CH_2\!=\!CANO_2$ wherein A is Cl, $CH_3$ or H;
4. $CH_2\!=\!CACON(R)_2$ wherein A is $CH_3$ or H;

wherein R is a 1 to 15 carbon atom alkyl, a 4 to 15 carbon atom cycloalkyl, an aromatic, a 1 to 15 carbon atom alkyl substituted aromatic, a 4 to 15 carbon atom cycloalkyl substituted aromatic, or hydrogen;

said copolymer made from monomers of conjugated dienes and vinyl substituted aromatics;

reacting said anionically prepared polymer with a compound selected from the class consisting of a polyisocyanate or a polyisothiocyanate to form an end capped polymer, said polyisocyanate or said polyisothiocyanate having the formula

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur;

reacting an amide compound with said end capped polymer to form an imide-type terminated polymer;

hydrolyzing said imide terminated polymer to produce the primary amine terminated polymer;

reacting said amine terminated polymer with a urethane constituent selected from the class consisting of (a) a urethane polymer made from urethane-forming monomers, (b) a urethane prepolymer made from urethane-forming monomers, and (c) urethane-forming monomers; and polymerizing said urethane-forming monomers or said urethane prepolymer to produce a urethane polymer, said urethane polymer connected to said amine terminated polymer and forming said urethane block copolymer.

Generally, a urethane-urea block copolymer composition, comprises:

an amine terminated polymer connected to a urethane-urea polymer constituent to form the urethane-urea block copolymer;

said amine terminated polymer being an end capped polymer formed by the reaction of an anionically prepared polymer and a single polyisocyanate or polyisothiocyanate compound so that at least one unreacted isocyanate or isothiocyanate end portion exists wherein said unreacted isocyanate or isothiocyanate end portion has been converted to an amine group;

said polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of
1. $CH_2=CACN$ wherein A is CN, $CF_3$, $CH_3$ or H;
2. $CH_2=CACO_2R$ wherein A is $CO_2R$, $SO_2R$, $CH_3$ or H;
3. $CH_2=CANO_2$ wherein A is Cl, $CH_3$ or H;
4. $CH_2=CACON(R)_2$ wherein A is $CH_3$ or H;

wherein R is a 1 to 15 carbon atom alkyl, a 4 to 15 carbon atom cycloalkyl, an aromatic, a 1 to 15 carbon atom alkyl substituted aromatic, a 4 to 15 carbon atom cycloalkyl substituted aromatic, or hydrogen;

said copolymer made from monomers of conjugated dienes and vinyl substituted aromatics;

said polyisocyanate and said polyisothiocyanate having the formula

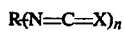

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur;

said urethane-urea polymer constituent being the reaction product of polyisocyanates with polyhydroxy compounds and diamines;

said urethane-urea forming polyisocyanate monomers having the formula

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur; and said polyhydroxy compound having at least two hydroxyl groups thereon.

Additionally, a process for producing a urethane-urea block copolymer, comprises the steps of:

anionically polymerizing polymers to form a polymer, said polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of
1. $CH_2=CACN$ wherein A is CN, $CF_3$, $CH_3$ or H;
2. $CH_2=CACO_2R$ wherein A is $CO_2R$, $SO_2R$, $CH_3$ or H;
3. $CH_2=CANO_2$ wherein A is Cl, $CH_3$ or H;
4. $CH_2=CACON(R)_2$ wherein A is $CH_3$ or H;

wherein R is a 1 to 15 carbon atom alkyl, a 4 to 15 carbon atom cycloalkyl, an aromatic, a 1 to 15 carbon atom alkyl substituted aromatic, a 4 to 15 carbon atom cycloalkyl substituted aromatic, or hydrogen;

said copolymer made from monomers of conjugated dienes and vinyl substituted aromatics;

reacting said anionically prepared polymer with a compound selected from the class consisting of a polyisocyanate or a polyisothiocyanate to form an end capped polymer, said polyisocyanate or said polyisothiocyanate having the formula

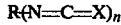

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur;

reacting an amide compound with said end capped polymer to form an imide-type terminated polymer;

hydrolyzing said imide terminating polymer to produce the primary amine terminated polymer;

reacting said amine terminated polymer with a urethane-urea constituent selected from the class consisting of (a) a urethane-urea polymer made from urethane-urea forming monomers, (b) a prepolymer made from urethane-urea forming monomers, and (c) urethane-urea forming monomers; and polymerizing said urethane-urea forming monomers or said urethane-urea prepolymers to form a urethane-urea polymer;

said urethane-urea polymer connected to said amine terminated polymer and forming said urethane-urea block copolymer.

Generally, an imide block copolymer composition, comprises:

an amine terminated polymer connected to an imide polymer constituent to form the imide block copolymer;

said amine terminated polymer being an end capped polymer formed by the reaction of an anionically prepared polymer and a single polyisocyanate or polyisothiocyanate compound so that at least one unreacted isocyanate or isothiocyanate end portion exists wherein said unreacted isocyanate or isothiocyanate end portion has been converted to an amine group;

said polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of
1. $CH_2=CACN$ wherein A is CN, $CF_3$, $CH_3$ or H;
2. $CH_2=CACO_2R$ wherein A is $CO_2R$, $SO_2R$, $CH_3$ or H;
3. $CH_2=CANO_2$ wherein A is Cl, $CH_3$ or H;
4. $CH_2=CACON(R)_2$ wherein A is $CH_3$ or H;

wherein R is a 1 to 15 carbon atom alkyl, a 4 to 15 carbon atom cycloalkyl, an aromatic, a 1 to 15 carbon atom alkyl substituted aromatic, a 4 to 15 carbon atom cycloalkyl substituted aromatic, or hydrogen, said copolymer made from monomers of conjugated dienes and vinyl substituted aromatics;

said polyisocyanate and said polyisothiocyanate having the formula

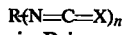

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur;

said imide constituent being the reaction product of a diamine and a dianhydride, said diamine selected from the class consisting of an alkyl diamine having from 2 to about 20 carbon atoms, a cycloalkyl diamine having from 4 to about 20 carbon atoms, an aromatic diamine having from 6 to about 20 carbon atoms, and an alkyl substituted aromatic diamine having from 7 to about 20 carbon atoms;

said dianhydride selected from the class consisting of an alkyl dianhydride having from 8 to 30 carbon atoms, an aromatic dianhydride having from 10 to 40 carbon atoms, and an alkyl substituted aromatic dianhydride having from 11 to 40 carbon atoms.

Additionally, a process for producing an imide block copolymer, comprises the steps of:

anionically polymerizing monomers to form a polymer, said polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of 1. $CH_2=CACN$ wherein A is CN, $CF_3$, $CH_3$ or H;
2. $CH_2=CACO_2R$ wherein A is $CO_2R$, $SO_2R$, $CH_3$ or H;
3. $CH_2=CANO_2$ wherein A is Cl, $CH_3$ or H;
4. $CH_2=CACON(R)_2$ wherein A is $CH_3$ or H;

wherein R is a 1 to 15 carbon atom alkyl, a 4 to 15 carbon atom cycloalkyl, an aromatic, a 1 to 15 carbon atom alkyl substituted aromatic, a 4 to 15 carbon atom cycloalkyl substituted aromatic, or hydrogen, said copolymer made from monomers of conjugated dienes and vinyl substituted aromatics;

reacting said anionically prepared polymer with a compound selected from the class consisting of a polyisocyanate or a polyisothiocyanate to form an end capped polymer, said polyisocyanate or said polyisothiocyanate having the formula

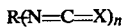

$R(N=C=X)_n$ wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur;

reacting an amide compound with said end capped polymer to form an imide-type terminated polymer;

hydrolyzing said imide terminated polymer to produce the primary amine terminated polymer;

reacting said amine terminated polymer with imide-forming monomers; and polymerizing said imide-forming monomers to produce an imide polymer;

said imide polymer connected to said amine terminated polymer and forming the imide block copolymer;

said imide polymer being the reaction product of a diamine and a dianhydride, said diamine selected from the class consisting of an alkyl diamine having from 2 to about 20 carbon atoms, a cycloalkyl diamine having from 4 to about 20 carbon atoms, an aromatic diamine having from 6 to about 20 carbon atoms, and an alkyl substituted aromatic diamine having from 7 to about 20 carbon atoms;

said dianhydride selected from the class consisting of an alkyl dianhydride having from 8 to 30 carbon atoms, an aromatic dianhydride having from 10 to 40 carbon atoms, and an alkyl substituted aromatic dianhydride having from 11 to 40 carbon atoms.

Generally, a nylon block copolymer foam composition, comprises:

an amine terminated polymer connected to a nylon polymer constituent to form the nylon block copolymer composition;

said amine terminated polymer being an end capped polymer formed by the reaction of an anionically prepared polymer and a single polyisocyanate or polyisothiocyanate compound so that at least one unreacted isocyanate or isothiocyanate end portion exists wherein said unreacted isocyanate or isothiocyanate end portion has been converted to an amine group;

said polymer being a homopolymer or a copolymer, said homopolymer made from monomers selected from the class consisting of conjugated dienes and vinyl substituted aromatics, said copolymer made from monomers of conjugated dienes and vinyl substituted aromatics;

said polyisocyanate and said polyisothiocyanate having the formula

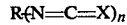

$R(N=C=X)_n$ wherein R is an aliphatic containing from 2 to about 20 carbon atoms, a cycloaliphatic containing from 4 to about 20 carbon atoms, an aromatic containing from 6 to about 20 carbon atoms, and combinations thereof, n is 2 and X is selected from the class consisting of oxygen and sulfur;

said nylon constituent made from monomers selected from the class consisting of (a) anionically polymerizable lactams having from 3 to 15 carbon atoms, (b) diacid chlorides reacted with diamines, and (c) diacids reacted with diamines so that salts thereof are formed;

the amount of said nylon polymer constituent ranging from about 5 percent to about 95 percent by weight based upon the total weight of said block copolymer; and from 0.5 to about 50 parts by weight of a blowing agent per 100 parts by weight of said block copolymer.

Additionally, a process for producing a nylon block copolymer foam, comprises the steps of:

anionically polymerizing monomers to form a polymer, said polymer being a homopolymer or a copolymer, said homopolymer made from monomers selected from the class consisting of a conjugated diene and a vinyl substituted aromatic, said copolymer made from monomers of conjugated dienes and vinyl substituted aromatics;

reacting said anionically prepared polymer with a compound selected from the class consisting of a polyisocyanate or a polyisothiocyanate to form an end capped polymer, said polyisocyanate or said polyisothiocyanate having the formula

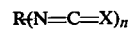

$R(N=C=X)_n$ wherein R is an alkyl containing from 2 to 20 carbon atoms, a cycloalkyl containing from 4 to 20 carbon atoms, an aromatic containing from 6 to 20 carbon atoms, and combinations thereof, n is 2 and X is selected from the class consisting of oxygen and sulfur;

reacting an amide compound with said end capped polymer to form an imide-type terminated polymer;

hydrolyzing said imide terminated polymer to produce an amine terminated polymer;
reacting said amine terminated polymer with nylon-forming monomers to form a block copolymer, said monomers selected from the class consisting of (a) lactams having from 3 to 15 carbon atoms, (b) diamines with diacid chlorides, and (c) salts of diacids and diamines;
wherein said amide compound is selected from the class consisting of amides of ammonia, amides of primary amines, lactams, sulfonic acid amides, sultams, and a compound having the formula

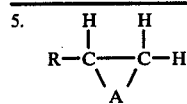

wherein $R_1$ and $R_2$ are selected from the class consisting of an aliphatic containing from 1 to 20 carbon atoms, a cycloaliphatic containing from 4 to 20 carbon atoms, an aromatic containing from 6 to 20 carbon atoms, combinations thereof, or hydrogen, and wherein X is oxygen or sulfur;
said nylon polymer constituent of said block copolymer ranging from about 5 percent to about 90 percent by weight;
utilizing an equivalent amount of said amide compound to said end capped polyisocyanate polymer ranging from about 1 to about 20;
utilizing an equivalent amount of said water to said amide compound ranging from about 1.0 to about 10;
the molecular weight of said amine terminated polymer ranges from about 3,000 to about 100,000 and the molecular weight of said nylon polymer constituent ranges from about 5,000 to about 50,000; and
producing a foam by adding from 0.5 to about 50 parts of a blowing agent for every 100 parts of said block copolymer.

PREFERRED EMBODIMENTS OF THE INVENTION

The monomers which can be anionically polymerized by initiators such as described herein to form an anionically prepared polymer and then reacted with the polyisocyanates or polyisothiocyanates also described herein to form end capped polymers include a wide variety of materials. Generally, any monomer capable of undergoing anionic polymerization can be used. Some of these monomers can be generally classified as olefins since they contain at least one olefinic group and may be represented by the following structural formulae, wherein R is hydrogen, an alkyl having from 1 to 15 carbon atoms, a cycloalkyl having from 4 to 15 carbon atoms, an aromatic ring, i.e. phenyl, or a substituted aromatic ring wherein said substituted group is an alkyl group having from 1 to 15 carbon atoms or a cycloalkyl group having from 4 to 15 carbon atoms:

1. $CH_2=CACN$ wherein A is CN, $CF_3$, $CH_3$ or H;
2. $CH_2=CACO_2R$ wherein A is $CO_2R$, $SO_2R$, $CH_3$ or H;
3. $CH_2=CANO_2$ wherein A is Cl, $CH_3$ or H;
4. $CH_2=CACON(R)_2$ wherein A is $CH_3$ or H.

Other monomers which can be anionically polymerized are represented by the following structural formula:

5. 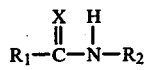  where A is O or S and R is an aliphatic, cycloaliphatic, an aromatic group, or mixtures thereof containing from 1 to 15 carbon atoms, inclusive; that is, an alkyl having from 1 to 15 carbon atoms, a cycloalkyl having from 4 to 15 carbon atoms, an aromatic ring, that is, phenyl, or a substituted aromatic ring wherein said substituted group is an alkyl having from 1 to 15 carbon atoms or a cycloalkyl group having from 4 to 15 carbon atoms, or hydrogen.

6. $RCH=A$  where A is O or S and R is an aliphatic, cycloaliphatic, an aromatic group, or mixtures thereof containing from 1 to 15 carbon atoms, inclusive; that is, an alkyl having from 1 to 15 carbon atoms, a cycloalkyl having from 4 to 15 carbon atoms, an aromatic ring, that is, phenyl, or a substituted aromatic ring wherein said substituted group is an alkyl having from 1 to 15 carbon atoms or a cycloalkyl group having from 4 to 15 carbon atoms, or hydrogen.

7. $(R)_2-C-C-H_2$ / $H_2-C-A$  where A is O or S and R is an aliphatic, cycloaliphatic, an aromatic group, or mixtures thereof containing from 1 to 15 carbon atoms, inclusive; that is, an alkyl having from 1 to 15 carbon atoms, a cycloalkyl having from 4 to 15 carbon atoms, an aromatic ring, that is, phenyl, or a substituted aromatic ring wherein said substituted group is an alkyl having from 1 to 15 carbon atoms or a cycloalkyl group having from 4 to 15 carbon atoms, or hydrogen.

8. $(R)_2-C=S$  where A is O or S and R is an aliphatic, cycloaliphatic, an aromatic group, or mixtures thereof containing from 1 to 15 carbon atoms, inclusive, that is, an alkyl having from 1 to 15 carbon atoms, a cycloalkyl having from 4 to 15 carbon atoms, an aromatic ring, that is, phenyl, or a substituted aromatic ring wherein said substituted group is an alkyl having from 1 to 15 carbon atoms or a cycloalkyl group having from 4 to 15 carbon atoms, or hydrogen.

The monomers as represented by Formulae 5, 6, 7 and 8 are preferred in the subject invention. Examples of such monomers include ethylene oxide, propylene oxide, styrene oxide, ethylene sulfide, propylene sulfide, styrene sulfide, acetaldehyde, propionaldehyde, isobutyrylaldehyde, n-caproaldehyde, acetothioaldehyde, propionthioaldehyde, isobutyrylthioaldehyde, n-caprothioaldehyde, 3,3-dimethyloxycyclobutane, 3,3-diethyloxycyclobutane, 3-methyl-3-ethyloxycyclobutane, 3,3-dimethylthiocyclobutane, 3,3-diethylthiocyclobutane, 3-methyl-3-ethylthiocyclobutane, methyl ethyl thioketone, methyl isopropyl thioketone and diethyl thioketone. Suitable monomers represented by Formula No. 8 do not include large R groups such as two phenyl groups since such monomers are difficult to polymerize due to steric hindrance.

Other preferred monomers which may generally be used to prepare the isocyanate terminated polymers of this invention are the conjugated dienes and the vinyl substituted aromatic compounds. The conjugated dienes ordinarily contain from 4 to 12 carbon atoms and preferably from 4 to 8 carbon atoms. Examples of such dienes include 1,3-butadiene, isoprene, 2,3-dimethyl-1,3- butadiene, 2-methyl-1,3-pentadiene, 3,4-dimethyl-1,3-hexadiene, 4,5-diethyl-1,3-octadiene, 3-butyl-1,3-octadiene, phenyl-1,3-butadiene, and the like. The vinyl substituted aromatic compounds include styrene, 1-vinylnaphthalene, 2-vinylnaphthalene, and the alkyl, cycloalkyl, aryl, alkaryl and aralkyl derivatives thereof in which the total number of carbon atoms in the compound is generally at least 8 but not greater than 20. Examples of such compounds include the various vinyltoluenes such as 2-, 3-, or 4-methylstyrene, alpha-methylstyrene, 4-n-propylstyrene, 4-t-butylstyrene, 4-dodecylstyrene, 4-cyclohexylstyrene, 2-ethyl-4-benzylstyrene, 4-methoxystyrene, 4-dimethylaminostyrene, 3,5-diphenoxystyrene, 4-p-tolylstyrene, 4-phenylstyrene, 4,5-dimethyl-1-vinylnaphthalene, 3-n-propyl-2-vinylnaphthalene, and the like.

The conjugated dienes and the vinyl substituted aromatic compounds, as well as many of the other monomers noted herein, generally can be polymerized alone or in a mixture to form homopolymers, copolymers or block copolymers which serve as the base polymer. The dienes which are preferred are 1,3-butadiene and isoprene, and preferred vinyl substituted aromatic monomers are styrene, vinyltoluene, alpha-methylstyrene and 4-t-butylstyrene. A preferred copolymer is styrene-butadiene.

Yet another group of monomers which can be employed are the heterocyclic nitrogen-containing monomers such as pyridine and quinoline derivatives containing at least a vinyl or an alpha-methylvinyl group such as 2-vinylpyridine, 3-vinylpyridine, 4-vinylpyridine, 3-ethyl-5-vinylpyridine, 3-methyl-5-vinylpyridine, 3,5-diethyl-4-vinylpyridine and similar mono- and disubstituted alkaryl pyridines, and the like; quinolines such as 2-vinylquinoline, 3-vinylquinoline, 4-vinylquinoline, and so forth. In general, the various vinyl substituted pyridines and vinyl substituted quinolines are also preferred monomers.

Monomers which are highly preferred are the rubber-forming monomers such as the conjugated dienes and mixtures of dienes and vinyl substituted aromatics such as butadiene-styrene.

The polymers are prepared by anionically polymerizing the monomers with conventional anionic initiators such as organo alkali metal initiators in a manner which is well known to those skilled in the art. Although these initiators can be either mono- or polyfunctional, the monofunctional initators are preferred for the present invention.

The preferred metal is lithium although sodium, potassium, rubidium and cesium are generally suitable. Hence, the preferred class of compounds can be presented by the formula RLi wherein R is a hydrocarbon radical selected from the class consisting of aliphatic, cycloaliphatic and aromatic radicals containing from 1 to 30 carbon atoms per molecule. Examples of these initiators include methyllithium, n-butyllithium, n-amyllithium, n-decyllithium, phenyllithium, naphthyllithium, p-tolyllithium, 9-fluoroenyllithium, cyclohexyllithium, eicosyllithium, and the like, with n-butyllithium being highly preferred. The essential feature of these initiators is that they possess a carbon-lithium bond which acts on the point of initiation for the polymerization. The growth of the polymer is also propagated through the carbon-lithium bond which becomes a part of the polymer at this stage. Of the resulting polymers obtained, substantially all have a lithium atom positioned at one end.

The amount of catalyst employed depends primarily on the monomers to be used and the characteristics desired in the polymer produced. In general, an increased amount of catalyst leads to the production of a lower molecular weight polymer, whereas a reduced amount of catalyst has an opposite effect. Suitable polymers having a molecular weight in the range of 3,000 to about 100,000 can be readily prepared, ordinarily by using initiator levels in the range of about 33.3 to 1 millimole per 100 grams of monomer (mhm). Of course, polymers of higher or lower molecular weights can be prepared by varying the initiator level. Thus, polymers of high molecular weights which may be viscous or solid can be produced by using an initiator level of approximately 0.25 mhm or less. Generally, the initiator level for this invention is commonly in the range of about 20 to about 5 mhm since a desired molecular weight range is from about 5,000 to about 20,000 for most amine terminated polymers.

Formation of the polymers is generally carried out at a temperature in the range between $-100°$ C. and $150°$ C. and preferably between $-78°$ C. and $50°$ C., with temperatures at the lower part of the range being desirable at this stage. The precise temperature of polymerization, of course, will depend to a large degree upon the particular reactivities of the monomers being reacted. The pressure will generally be low, that is approximately 1 atmosphere or higher and is usually related to the monomer and solvent volatilities. For example with ethylene, higher pressures are encountered than with butadiene or styrene.

The process or the polymerizations are generally carried out in a hydrocarbon or ether medium. Normally, the solvents or diluents are paraffins, cycloparaffins or aromatics containing from 4 to 10 carbon atoms per molecule. Examples of solvents include n-butane, n-hexane, n-heptane, isooctane, cyclohexane, methylcyclohexane, benzene, toluene, xylene, tetrahydrofuran, dimethyl ether, and the like. The important considerations in selecting solvents are that they should be inert, they should have some affinity for the polymer formed, and they should not contain in their structure any active hydrogen atoms or any impurities having an active hydrogen atom such as water, alcohols, or acid groups which would have a tendency to act as a chain-terminating or transfer agent.

In accordance with the concepts of the present invention, the anionically prepared polymers are reacted usually with a single polyisocyanate or a polyisothiocyanate monomer to produce end capped polymers having at least one unreacted isocyanate or isothiocyanate end portion. Then, through a series of steps, an amine group is substituted for the unreacted or free isocyanate or isothiocyanate end portion, thereby forming the amine terminated polymer. The actual structure of the amine terminated polymer contains the anionically prepared polymer connected to an amide or a thioamide group (the result of the initial isocyanate or isothiocyanate group of the polyisocyanate or the polyisothiocyanate which has reacted with the polymer), a hydrocarbon group which is the R portion of the polyisocyanate or the polyisothiocyanate as set forth below, and the formed amine end group. The terms polyisocyanate and polyisothiocyanate are used in this specification in the sense that the compounds described by these terms are polyfunctional and, therefore, may react with two or more entities. The polyisocyanates and the polyisothiocyanates are preferably those compounds represented by the formula R $(-N=C=X)_n$ where R can be an aliphatic or, preferably, an alkyl containing from 2 to about 20 carbon atoms, a cycloaliphatic or, preferably, a cycloalkyl containing from 4 to about 20 carbon atoms, an aromatic containing from 6 to about 20 carbon atoms or combinations thereof, n is an integer such as 2 or 3, with 2 being highly preferred and X is a chalogen (oxygen or sulfur). Examples of polyisocyanates include diphenyl diisocyanates, 2,4,4'-triisocyanatediphenyl ether, triphenyl methane triisocyanate, benzene-1,2,4-triisocyanate, naphthalene-1,3,7-triisocyanate and the like. Highly preferred diisocyanates include meta- or para-phenylene diisocyanate, diphenyl methane diisocyanates, bitolylene diisocyanates, dianisidine diisocyanates, isophorone diisocyanates, toluene diisocyanates, hexamethylene diisocyanate and pentamethylene diisocyanate. Examples of polyisothiocyanates generally include compounds which are the same as the polyisocyanates but wherein, of course, a sulfur atom has been substituted for the oxygen atom. Thus, suitable polyisothiocyanates include diphenyl diisothiocyanates, 2,4,4'-triisothiocyanate diphenyl ether, triphenyl methane triisothiocyanate, and the like. Preferred diisothiocyanates include meta- or para-phenylene diisothiocyanate, diphenyl methane diisothiocyanates, bitolylene diisothiocyanates, dianisidine diisothiocyanates, toluene diisothiocyanates, hexamethylene diisothiocyanates, and pentamethylene diisothiocyanates.

Henceforth, in the specification, whenever reference is made to an isocyanate or polyisocyanate compound, it is to be understood that such reference also usually includes isothiocyanate or polyisothiocyanate compounds.

The amounts of polyfunctional isocyanates which may be used generally depend upon the particular system to be produced. For most systems, the equivalent ratio of the polyisocyanates to the alkali metal or lithium present in the polymers may range from 1.1 to about 20, while in other systems, the upper limit of the range may be in excess of 100. When a polyisocyanate is employed to react with the lithium terminated or base polymers, each polyfunctional isocyanate will sometimes react with more than one lithium terminated polymer, thereby coupling the polymers and forming a resulting polymer which does not contain an isocyanate on an end portion of the polymer. This situation generally cannot be avoided and, therefore, to achieve a fair amount of polymers which have at least one isocyanate end group, the equivalent ratio of one isocyanate end group and the equivalent ratio of the polyfunctional isocyanates to the lithium must be greater than 1.0. Should the equivalent ratio be less than 1.0 but greater than 0.5, the resultant polymeric solution may contain; and, when the equivalent ratio is 0.5 or less, the resultant polymeric solution will likely contain, some unreacted lithium terminated polymers. When the equivalent ratio is approximately 2.0, statistical consideration reveals that when a diisocyanate is employed, approximately 50 percent of the polymers have an isocyanate end group. When a triisocyanate is employed with an equivalent ratio of 3.0, the amount of polymers which are terminated by at least one unreacted isocyanate group is increased to approximately 67 percent. In general, as the equivalent ratio increases, the percentage of isocyanate terminated polymers increases as well as the amount of completely unreacted or free polyisocyanates. Generally, an amount of polyisocyanate should be used so that at least 5 percent and, preferably, at least 20 percent of the polymers are terminated by at least one isocyanate group. An amount of 30 percent to about 65 percent or above is highly desirable or highly preferred. Usually, as a practical matter, it is difficult to achieve amounts in excess of 65 percent of anionically polymerized polymers end capped with a free isocyanate group due to coupling. As should be apparent to one skilled in the art, the addition of polyfunctional isocyanates should be carried out rapidly to avoid excessive coupling.

During the process of formation of the isocyanate and capped polymers, it is important that the reaction be carried out in an environment substantially free from active hydrogen compounds such as water, alcohol or acids so that the polymers are terminated by an isocyanate group. Hence, the process is usually carried out in an inert atmosphere such as in a nitrogen or helium atmosphere.

The temperature range for the polyfunctional isocyanate reaction is generally between $-100°$ C. and $150°$ C., and preferably, between $-78°$ C. and $70°$ C. It has been found that temperatures at the lower end of the preferred range produced better results, possibly since polyfunctional isocyanate-consuming side reactions are reduced.

The preparation of the end capped, anionically produced polymers will be more fully understood by referring to the following examples.

EXAMPLE I

1,2-POLYBUTADIENE

To a clean, dry, nitrogen purged, 28 oz. beverage bottle was added 600 cc of purified tetrahydrofuran and 77.6 g of butadiene. After cooling to $-20°$ C., 1.52 cc of 1.64 molar ($2.49 \times 10^{-3}$ moles) n-butyllithium in a hexane solution was added and held at $-20°$ C. for 4 hrs., until the butadiene had polymerized. To this lithium polybutadiene, which was 85 percent 1,2-microstructure, was rapidly added 5.92 cc of a 1.22 molar ($7.21 \times 10^{-3}$ moles) toluene diisocyanate solution in toluene. The resulting polymer had an average molecular weight of 31,000.

EXAMPLE II

1,4-POLYBUTADIENE

To a clean, dry, 28 oz. beverage bottle was added 500–600 cc of purified toluene, 98.1 g of butadiene and 1.43 cc of 1.75 molar ($2.5 \times 10^{-3}$ moles) n-butyllithium in a hexane solution. The bottle was stirred magnetically overnight at 25° C. before rapidly adding 2.52 cc of 0.995 molar toluene diisocyanate ($2.5 \times 10^{-3}$ moles). This solution was stirred for 1 hr. and the product was precipitated with methanol. The resulting 1,4-polybutadiene had a viscosity average molecular weight of 56,000 g/mole and a vinyl content of about 10 percent.

The above-described polyisocyanate or polyisothiocyanate end capped polymers of the polymeric composition, according to the concepts of the present invention, are further reacted with an amide compound to give an imide-type terminated, anionically prepared polymer. Such amine terminated polymers have been found to be very stable or unreactive to moisture, impurities, and the like, and are stable for extended periods of time such as months and even years. Moreover, such amine terminated polymers can be shipped to various plants and stored before utilization. Additionally, the amine terminated compounds of the present invention are particularly suitable in processes wherein the precise stoichiometric relationship of the amine terminated compounds, with respect to reactant compounds as in the formation of block copolymers, is very important to the production of compounds which possess good physical properties. That is, due to the inherent factors involved in the production of polyisocyanate end capped, anionically prepared polymers such as elastomers, the exact amount of end capped polymers which constitutes further reaction sites are unknown at the time of production and, hence, often in a continuous process cannot be readily determined by chemical analysis until after the next succeeding reaction step has been carried out. Thus, off-grade or poor products are often unintentionally produced and are difficult to avoid in such continuous processes. In the formation of block copolymers, knowledge of the specific amount of end capped or amine terminated polymers is very important when they are reacted with acid halides, imide and urea-forming compounds or polymers.

Desirable amides include those which, upon reaction with the isocyanate end capped polymer, produce an imide-type structure which can then be hydrolyzed. Suitable amides include amindes of ammonia or primary amines, lactams, sulfonic acid amides and sultams. Therefore, amides having the formula

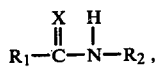

an amide of a primary amine, wherein $R_1$ and $R_2$ are preferably an aliphatic or an aromatic may be utilized along with the less desirable cycloaliphatic, as well as mixtures of aliphatic, cycloaliphatic and aromatic groups wherein $R_1$ and $R_2$ have from 1 to about 20 total carbon atoms and wherein X is oxygen or sulfur. A specific and preferred example is oleamide. Of course, $R_1$ and $R_2$ may simply be hydrogen. It is noted that amides of secondary amines, that is, N,N-disubstituted amides cannot be used since they will not react with the isocyanate end capped polymers due to the lack of a hydrogen bonded to the nitrogen atom. Specific examples of amide compounds wherein X is an oxygen or a sulfur, $R_2$ is a hydrogen and $R_1$ is preferably a hydrogen or an alkyl include formamide, acetamide, stearamide, and the like. Examples wherein $R_1$ is preferably an alkyl or an aromatic and $R_2$ is a hydrogen or an aromatic include acetanilide, benzamide and benzanilide. Another and a highly preferred class of amide compounds are the internal or cycloaliphatic amides such as the lactams. Generally, lactams having from 3 to about 16 total carbon atoms may be utilized. Preferred lactams include caprolactam and capryllactam, that is, lactams of primary amino acids. Additionally, the sultams may be utilized. Of course, the lactams and the sultams must contain an N-H group.

Additional amide-type compounds can be utilized for the present invention wherein

is replaced by an

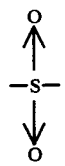

group, for example, the sulfonic acid amides. Similarly, in the lactams, the

group may be replaced by

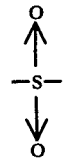

to form a sultam of a primary amino sulfonic acid. A specific example includes benzene sulfonamide. Suitable solvents for the sulfonamide compounds include hexane and tetrahydrofuran. Generally, the above amide compounds are preferred over the sulfonic acid amide and the sultam compounds.

Upon reaction of the amide-type compounds with the isocyanate or isothiocyanate end capped polymer, i.e. polymer-

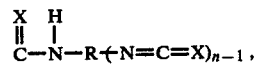

an imide-type

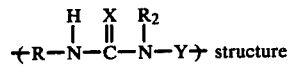 structure is produced wherein the polymer terminal structure is generally as follows:

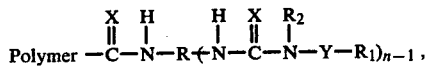

where X is oxygen or sulfur and Y is

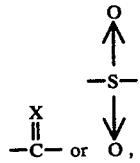

wherein R, $R_1$ and $R_2$ are as set forth above. Such terminal structure of the polymer for the purpose of the present invention, including the claims, is to be understood as an imide-type structure and is an intermediate in the production of the amine terminated polymer.

To insure that many or most of the end capped, anionically prepared polymers are eventually converted to amine terminated polymers, generally, the mole ratio of an amide compound is desirably from about 1.0 to about 10 and preferably about 2 with respect to the unreacted isocyanate groups. The amount of polyisocyanate utilized to react with the anionically prepared polymer is generally in excess of an equivalent amount as from 1.1 to about 20 and preferably a mole ratio of about 2 to insure that most all of the anionically prepared polymers are end capped, as well as to insure that a high proportion of such end capped polymers is produced. Thus, in the case of the preferred mole ratio, the amount of amide compound to an anionically prepared polymer will be 4 to 1 where diisocyanate compounds are utilized and will be 6 to 1 where triisocyanate compounds are utilized. Thus, when a triisocyanate is utilized, the reacted polymer may be terminated with two amine groups.

The addition of the amide compound was generally carried out at a temperature range of about −78° C. to about 50° C. and, preferably at the range of from about 0° C. to about 30° C. Of course, the temperature will generally vary according to the type of amide compound utilized. Generally, at temperatures below the lower broad limit, anionic polymerization becomes unfeasible. In the case where the particular type of amide compound is a lactam, the addition temperature of the amide is desirable at the molten temperature of the lactam.

After an imide-type terminated polymer is formed, it is hydrolyzed to produce the amine terminated, anionically produced polymer. Hydrolysis, which will generally vary depending upon the type of amide compound, may usually be carried out from −25° C. to about 100° C. with a temperature of about 15° C. generally being preferred, especially when the amide is caprolactam.

The mole ratio of water to the imide groups is from about 1.0 to about 10 and preferably about 2. A mole ratio in excess of or larger than 1.0 is preferred, of course, to insure a large amount of amine terminated polymer and to reduce the amount of coupling occurring during hydrolysis of the imide. Thus, if the mole ratio of diisocyanate utilized is twice that of the expected anionically prepared chains, the preferred mole ratio of amide compound will be four and the preferred lower amount of water to the number of anionically prepared polymers will be eight. Of course, larger or smaller amounts may be utilized with good results. Upon hydrolysis, the amide compound is separated from the polymer and carbon dioxide is given off, thus, producing an amine terminated polymer. Generally, if the above ranges of amide compound and water are utilized, the amount of isocyanate end capped polymers converted to amine terminated polymers is usually a minimum of 60 percent although with the preferred procedure, conversions of greater than 90 percent are usually obtained.

When an excess of polyisocyanate material is employed, there will exist excess or free polyamine materials. The presence of such polyamines is usually deleterious to the properties of some of the copolymers, as for example, 1,2-polybutadiene/nylon-6 block copolymer, while in other situations, its presence may be corrected by an additional amount of reactant, as for example, additional diacid chloride when diacid chlorides and diamines are added to make nylons (in order to form the desired block copolymer). These are some of the reasons why it is generally undesirable to utilize a large excess of polyisocyanate, that is, above the preferred amount for the formation of the amine terminated polymers.

The invention will be better understood by reference to the following examples.

EXAMPLE III

AMINE TERMINATED 1,4-POLYBUTADIENE

A clean, dry one-half gallon reactor fitted with a paddle-type stirrer was charged with 1500 g of butadiene-hexane blend (25 wt. percent butadiene) which had been dried to less than 50 ppm water by circulation through 3A molecular sieves. The temperature was controlled at 80° F. by circulating water in the reactor jacket. Polymerization was initiated by addition of 25.0 ml of 1.55 M n-butyllithium in hexane. After a short period of exothermic heating, the reaction temperature was maintained at 80° F. for 16 hrs. A sample was taken for analysis, then 10.7 ml of Hylene T (DuPont 2,4-toluene diisocyanate) was added with rapid stirring. Aliquots (300 ml of cement) were charged into five dry, nitrogen purged, 28 oz. beverage bottles containing 100 ml of dry distilled tetrahydrofuran and samples of various amides (see Table I). The polymer mixture remaining in the reactor was reacted with 5.7 g of molten caprolactam for 30 min. at 80° F. and then 10 ml of distilled water was added. The polymer cement from the reactor was stabilized with antioxidants and characterized as described below. The five bottle samples were placed in the 50° C. polymerization bath for the indicated times (see Table I). Completion of reaction of the amide with the isocyanate was taken to be a value of less than or equal to 0.1 for the ratio of the optical densities of the infra red absorptions for NCO (approximately 2260 cm$^{-1}$) to CH$_2$ (approximately 2850 cm$^{-1}$). The intermediate imides were then hydrolyzed by addition of 4 ml of distilled water. The overall coupling results from GPC measurements are given in Table I.

TABLE I

| Sample | Amide[a] | Reaction[b] time at 50° C. | | Percent Coupling by GPC[d] |
|---|---|---|---|---|
| 1 | Acetamide | 2 | hr. | 46.0 |
| 2 | Acetanilide | 2 | hr. | 9.0 |
| 3 | Benzamide | 2 | hr. | 49.0 |
| 4 | Benzanilide | 2 | hr. | 54.0 |
| 5 | Benzene Sulfonamide | 22 | hr.[c] | 79.0 |
| 6 | Caprolactam | 0.5 | hr. | 37.0 |

[a]Charged at 2/1 amide/TDI mole ratio
[b]Final NCO/CH$_2$ optical density ration ≦0.1
[c]Required tertiery amine catalyst to react appreciably
[d]Determined by comparison of the GPC curve of the amine terminated polymer with that of the base 1,4-polybutadiene

EXAMPLE IV

AMINE TERMINATED 1,2-POLYBUTADIENE

A clean, dry one-half gallon stainless steel reactor equipped with a paddle-type stirrer was charged with 1 kg of butadiene in hexane (50 wt. percent blend) which had been dried to less than 50 ppm water by circulation through 3A molecular sieves. The reaction mixture was cooled to −60° F. by circulation of refrigerated isopropanol through the reactor jacket. A modifier (15.2 ml of tetramethylethylenediamine) was added to promote the formation of high 1,2-microstructure. The polymerization was initiated by the addition of 50.0 ml of 1.62 M n-butyllithium in hexane and the temperature rose to 85° F. Cooling was maintained and the reaction temperature was held at −20° F. for 4.5 hr. A sample was taken for analysis of the polybutadiene (87 percent 1,2-microstructure, intrinsic viscosity of 0.205 at 25° C. in toluene). Then 14.3 ml of Hylene TM (DuPont 80/20 2,4-/2,6-toluene diisocyanate) was added rapidly with good agitation. A sample was taken for analysis and then 23.7 g of caprolactam in 125 ml of dry toluene was rapidly added. The reaction was stirred for 15 min. at −20° F., then 30 min. at 180° F. After cooling to 50° F., 20 ml of distilled water was added followed by antioxidants. The gel permeation chromatography analysis indicated 38 percent of the polymer was coupled or 62 percent amine terminated 1,2-polybutadiene present in the product.

EXAMPLE V

PILOT PLANT PREPARATION OF 1,2-AMINE TERMINATED POLYBUTADIENE

A five hundred gallon stainless steel reactor fitted with a single contour blade turbine conforming to the reactor bottom was employed. The reactor was baffled at a level requiring 100–200 gallons of material to be effective. The reactor was cooled to approximately 0° F. by circulating coolant through the jacket. The reactor was then charged with 360 lbs. of dimethyl ether and 9.5 lbs. of 15 percent n-butyllithium in hexane. A butadiene monomer, dried to less than 50 ppm water by circulation through a column packed with 3A molecular sieves, was metered into the reactor at a rate such that the temperature was maintained at 40° F. After an initial exotherm to 48° F., the desired temperature was maintained and a total of 200 lbs. of butadiene was charged over 8 hrs. A sample taken after completion of the butadiene addition showed 1,2-polybutadiene of greater than 97 percent 1,2-microstructure and a dilute solution viscosity of 0.20 dl/g on a 0.5 percent solution in toluene at 25° C. To the active lithium polymer cement was added 8 lbs. of Hylene T (DuPont 2,4-toluene diisocyanate) over 2.3 min. with maximum stirring. After sampling for analytical study, 40 lbs. of 25 wt. percent caprolactam in benzene dried to less than 50 ppm water by circulation through 3A molecular sieves was charged over 5 min. The reaction mixture was diluted by the addition of about 200 lbs. of dry hexane, as the dimethyl ether was removed by distillation. Distillation was accomplished by heating the mixture at 220° F. When essentially all of the dimethyl ether and a portion of the hexane had been removed, 1.45 kg of distilled water was added and the reaction mixture was cooled, stabilized with anti-oxidants, and dropped into drums as a 54.5 percent solids cement.

Titration of the polymeric base indicated that 49.5 percent of the material was amine terminated, in good agreement with the value of 51 percent non-coupled material measured by gel permeation chromatography.

EXAMPLE VI

COMPARISON OF WOOD FLOUR FILLED, 1,2-POLY-Bd AND AMINE TERMINATED 1,2-POLY-Bd

Samples of resin were compounded in hexane solution (40–60 percent resin solids) as indicated below. The mixing was done in a Kitchen Aid Mixer. Solvent was removed by drying in a vacuum at 50° C. Test specimens were cured 10' at 350° F. in preheated molds. The physical properties measured are tabulated below:

| SAMPLE NO. | 1 | 2 |
| --- | --- | --- |
| 1,2-Polybutadiene | 100 | — |
| Amine terminated, 1,2-PBD | — | 100 |
| Wood Flour | 100 | 100 |
| Paraformaldehyde | 1 | 1 |
| Dicup 40 | 7.5 | 7.5 |
| (40 percent dicumyl peroxide) | | |
| Flexural Strength, psi | 6160 | 10840 |
| Flexural Modulus, $\times 10^{-5}$, psi | 5.90 | 5.10 |
| Hardness, Rockwell E | 68 | 65 |
| Izod impact, notched ft. lb/in. | 0.2 | 0.2 |

A significant improvement in flexural strength was noted in the samples prepared with amine terminated 1,2-polybutadiene.

The amine terminated polymers produced according to the present invention can be generally reacted with polyisocyanates and various polymer forming monomers or actual polymers to produce block copolymers which are generally processable at ambient temperatures and yet, upon curing, exhibit physical properties of the added polymer.

According to the concepts of the present invention, the amine terminated polymers described above can generally be reacted under various conditions with amine reactive monomers and polymers to form block or graft copolymers.

A preferred amine reactive compound is a lactam having from 3 to about 15 total carbon atoms. Highly preferred lactams include caprolactam and capryllactam. When such lactams are polymerized, they will yield a nylon block copolymer which is readily processable at the processing temperature of the amine terminated polymer. Thus, when amine terminated 1,2- or 1,4-polybutadiene is used, the processing temperature will be ambient, whereas if amine terminated polystyrene is used, the processing temperature will be approximately 250° F. to 400° F. However, when the butadiene portion of the nylon block copolymer is cured, the copolymer will exhibit physical properties largely representative of the nylon constituent of the block copolymer in contrast to the elastomer constituent.

Another class of preferred amine reactive compounds includes the various aldehydes, ureas, and phenols to produce a copolymer constituent of urea-aldehyde or phenol-aldehyde. Depending upon the ratio of the amount of aldehyde to the other component utilized in the formation of urea-aldehyde and phenol-aldehyde, a block copolymer or a three-dimensional graft copolymer network will be produced. Due to the existence of multiple reactive sites on the phenols, the production of phenol-formaldehyde copolymers invariably results in a graft or highly crosslinked network. The block or graft copolymers formed exhibit good processing properties at ambient temperatures as well as at temperatures well below the crosslinking temperatures of either the urea-aldehyde or the phenol-aldehyde constituent.

Yet another class of amine reactive compounds which may be utilized in the preparation of the various polymers are the polyisocyanates or the polyisothiocyanates. The formulations utilized are generally similar, if not identical to those set forth above with respect to the end capping of the polymer.

Many other amine reactive compounds such as monomers and polymers exist as known to those skilled in the art. Representative classes of various amine reactive polymers are set forth in U.S. Pat. No. 3,755,261 which is hereby fully incorporated by reference with respect to the general and specific types of amine curable prepolymers or polymers. As set forth by the reference, one representative class of polymers are the epoxy resins such as those described in the *Encyclopedia of Polymer Science and Technology,* Volume 3 (1965), Pages 705 through 728. Yet another class of polymers which are amine reactive are the chlorosulfonated polymers such as those set forth in U.S. Pat. No. 2,723,257. Additionally, various chlorosulfonated monomers are also amine reactive and can, therefore, be reacted with the amine terminated polymer. A further class of amine reactive polymers are polymers which contain acid halide groups. Various monomers also containing such acid halide groups may be utilized to react with the amine terminated polymer and to form a polymer constituent thereon. Another amine reactive compound is the haloformate groups which may be contained by monomers or by polymers. Another group of amine reactive compounds includes monomers or polymers which contain anhydride groups which, upon reaction with an amine, result in an amide-acid linkage and may further react to give an imide. Another polymer which may be reactive with the amine terminated polymers of the present invention are the organopolysiloxanes such as those described in U.S. Pat. No. 2,938,010.

Therefore, the present invention contemplates the production of block copolymers from the amine terminated polymer such as block epoxy copolymers, block urethane copolymers, block urea copolymers, block urethane-urea copolymers and block polyimide copolymers.

In the production of nylon block copolymers, the elastomeric amine terminated polymers described above are connected to a nylon polymer as formed by the polymerization of lactams or the combination of diacid-chlorides and diamines or prepolymers thereof to give block copolymers which are readily processable and millable at ambient temperatures and possess excellent physical properties upon cure. Nylon block copolymers made utilizing nylon monomers and prepolymers are highly preferred since they tend to give better properties and are easier to prepare. The polymerization of the nylon constituent is generally via the anionic route and therefore extreme care must be taken to insure that the polymerization environment is substantially free of active hydrogen compounds such as water, alcohols, acids, and the like. Therefore, an inert atmosphere such as nitrogen is highly desirable. The required active hydrogen content in the reaction must generally be below 100 parts per million and preferably below 25 parts per million with a content below 5 parts per million being highly preferred, especially with respect to the amount of water in the polymerization system such as a reaction kettle or the like. The reaction may be carried out according to bulk or suspension polymerization techniques with bulk polymerization being preferred for lactams and suspension polymerization being preferred for diacid chlorides and diamine. However, since the amine terminated polymers decribed above tend to be very stable with respect to moisture, impurities and the like, the block polymerization process may be carried out well after the formation of the amine terminated polymer, such as for periods of six months, a year, and the like. Of course, before the block polymerization process can be commenced, the amine terminated polymer will have to be substantially purified of active hydrogen compounds such as water as by utilizing a nitrogen purge or by heating to 50°–100° C. under a vacuum of less than about 5 mm of mercury.

Lactams which may be utilized in the formation of the nylon constituent may contain from 2 to about 15 carbon atoms and preferably from 5 to 12 with caprolactam and capryllactam being highly preferred. The temperatures of the polymerization can generally range from about −50° C. to about 260° C. with a preferred range being from about 120° C. to about 180° C. Usually, no pressure need be applied to the system and the pressure of the system will be determined by the solvent system used as well as the polymerization temperature. Desirable solvents include hexane, toluene and the like so long as they do not contain active hydrogens.

Considering the use of diacid chloride and diamines, or salts of diacids and diamines to give a nylon constituent such as nylon 6,6; 6,10; or 6,T, generally any diacid chloride and diamine compound may be used as well known to those skilled in the art. For example, the acid chloride of adipic acid may be utilized with hexamethylene diamine. Other preferred examples of acid chlorides are the aromatic dicarbonyl chlorides containing from 8 to 16 carbon atoms such as terephthaloyl chloride. Preferred examples of diamines include aromatic compounds having from 6 to 15 carbon atoms such as m-phenylene diamine, 2,4-toluene diamine, methylene dianiline, and the like. The temperature range for copolymer preparation is usually much narrower than when utilizing lactams and generally ranges from about −20° C. to about 10° C. Lower temperatures result in the diacid chloride and/or the diamine compound precipitating out of solution whereas higher temperatures than the general range tend to hydrochlorinate the amine terminated polymer constituent such as polybutadiene. Although various nonactive hydrogen solvents may be utilized, dipolar aprotic solvents are preferred since they tend to pick up any hydrogen chloride formed during the polymerization. Preferred solvents include DMF (dimethylformamide), DMAC (dimethylacetamine) and HMPA (hexamethylphosphoroamide) along with an amount of toluene to maintain the amine terminated polymer in solution. The polymerization may be carried out under normal pressure conditions, that is, under the pressure generated by the solvent system at the polymerization temperatures.

Although the polymerization of lactams can be carried out with just the amine terminated polymers and monomers since the amine terminated portion of the polymer tends to act as an activator, coactivators may also be used. Toluene diisocyanate is an example of a specific and preferred coactivator. Usually, the polyisocyanates and the polyisothiocyanates can serve as activators with diisocyanates or triisocyanates preferred. Generally, any activator may be utilized as well known to those skilled in the art. Examples of additional activators are set forth in U.S. Pat. Nos. 3,017,392 and 3,028,369 which are hereby fully incorporated by reference with respect to such activators. The amount of coactivator will generally depend upon the final average nylon molecular weight desirable with smaller amounts of coactivator being utilized to give higher molecular weights.

To promote polymerization of the lactams to the nylon compound, a basic catalyst is utilized such as sodium hydride, a preferred catalyst. Generally, any sodium, potassium, rubidium, lithium or alkaline-earth compound capable of forming a metal salt of a lactam may be utilized as well known to those skilled in the art.

The nylon constituent of the block copolymer may have a molecular weight range of from about 5,000 to about 50,000 with a range of from 10,000 to about 30,000 being preferred. The amount of the amine terminated constituent with respect to the nylon constituent may range from a very low amount such as 5 percent to a very high amount such as 95 percent and the block copolymer will generally exhibit processing properties of the amine terminated constituent. Thus, if the amine terminated constituent is an elastomer, or more specifically, either 1,2-polybutadiene or 1,4-polybutadiene, the block copolymer may be processed accordingly. Generally, the higher the amount of the amine terminated constituent, the better are the processing properties with amounts of 20 percent and higher giving very good processing properties. A weight range of the nylon polymer constituent of from about 25 percent to about 80 percent is preferred.

The nylon block copolymer can be cured, that is, crosslinked through the use of conventional crosslinking agents such as organic peroxides with dicumyl peroxide being an example of a preferred peroxide.

It has been found that when a particular class of organic peroxides is used to cure the nylon block copolymers, the copolymers exhibit even further improved properties, especially when the base polymer or polybutadiene constituent has a high vinyl content. These organic peroxides can be represented by the following formula

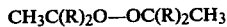

CH₃C(R)₂O—OC(R)₂CH₃ wherein R represents aryl or alkyl including cycloalkyl, aralkyl, alkaryl, etc., of 1 to 20 carbon atoms, inclusive. Typical R groups include methyl, ethyl, propyl, butyl, hexyl, heptyl, decyl, dodecyl, octadecyl, phenyl, tolyl, xylyl, benzyl, phenethyl, naphthyl, methylnaphthyl, naphthylethyl, diphenyl, benzylphenyl, butylphenyl, cyclohexyl, cycloheptyl, cyclohexylmethyl, cycloheptylethyl, methylcycloheptyl, and the like.

The organic peroxides of the above formula may be diperoxides or mixed peroxides, that is, peroxides which have two different CH₃C(R)₂O. radicals. Specific examples include dicumyl peroxide, a preferred peroxide, ditertiarylbutyl peroxide, Vulcup, manufactured by Hercules (α,α',-bis-(t-butylperoxy)-diisopropyl benzene), tertiarybutyl-cumyl peroxide, ditertiaryamyl peroxide, tertiarybutyl-tertiaryamyl peroxide, tertiaryamyl-cumyl peroxide, ditertiaryoctyl peroxide, bis(1,1-diphenyl-ethyl)peroxide, bis(1,1-dicyclohexyl-ethyl)-peroxide, bis(1-cyclohexyl-1-methyl-ethyl)peroxide [also known as bis(2-cyclohexyl-2-propyl)peroxide], bis(1-phenyl-1-ethyl-ethyl)peroxide [also known as bis-2(2-phenylbutyl)peroxide], and the like. The symmetrical peroxides which have identical groups on each side of the peroxy oxygens are generally more available and therefore are preferred. However, mixed peroxides, when available, can be used very satisfactorily.

Whether mixed peroxides or diperoxides of the above class are used to impart to the block copolymers' improved properties, which are generally more favorable than if ordinary peroxides other than the above class were used, the peroxides used are advantageously those having a reasonably fast rate of decomposition at the temperature employed.

The nylon block copolymers formed when cured possess good physical properties characteristic of nylon such as impact resistance, high abrasion resistance, tensile strength and toughness, and can therefore generally be used as an engineering or structural plastic having low flammability. Desired end uses, thus, include appliance housings, cabinets, rigid panels, and the like. If the amine terminated polymer is formed from the 1,4-polybutadiene microstructure and the block copolymer has a high nylon content as in excess of 75 percent, the block copolymer may be employed as textile fibers and as tire cord similar to the use of nylon. If the amount of nylon content is lower, the 1,4-polybutadiene-nylon block copolymer can be utilized for hoses, flexible pipes, and the like. If the block copolymer contains a 1,2-polybutadiene microstructure, it can be used for casters, gears, plastic pipe, and the like. Moreover, as with nylon polymers, various conventional fillers and reinforcing agents may be added such as silica and the like. Various fibers such as wood, metal, rayon, etc., may also be added but they tend to greatly reduce the processability of the uncured polymer.

The invention will be more fully understood by reference to the following examples which describe the preparation of various polybutadiene-nylon block copolymers.

EXAMPLE VII

34.5/65.5 1,2-Polybutadiene/Nylon-6 Block Copolymer

The preparation of the block copolymer from an amine terminated polymer can be carried out in any reaction vessel capable of withstanding temperatures up to about 200° C., having provisions for mechanical stirring and capable of maintaining an inert atmosphere and small pressures. The starting materials of an amine terminated polymer and a preferred nylon monomer or prepolymer may be charged in any order as liquids, solids, melts, or combinations thereof. Of course, the starting materials must be dried, either separately or in combination to remove water and other low molecular weight impurities. Solutions or liquids may be dried by contacting them with activated molecular sieves or activated alumina whereas solids and melts are preferably dried by subjecting them to a vacuum of less than about 2 mm of mercury at temperatures up to 120° C. and preferably at a vacuum of less than 1 mm of mercury at 100° C. for 5 to 16 hrs.

To a stainless steel resin kettle of 500 ml capacity having a mechanical stirrer and a vacuum takeoff, was added 102 g of a cement of 1,2-polybutadiene amine terminated polymer in hexane, approximately 73.5 percent solids, at a molecular weight of about 14,700 g/mole along with 150 g of flake caprolactam. The mixture was warmed in a warm water bath from about 30° C. to about 50° C. and a vacuum of 30 to about 80 mm of mercury applied to remove the bulk of the hexane. The resulting mixture was then heated from about 90° C. to about 150° C. in a Wood's Metal Bath and a vacuum of less than 2 mm of mercury was applied and maintained for a 16 hr. period with stirring. Nitrogen was then admitted to the resin kettle and a slight nitrogen purge maintained during the remainder of the preparation. To the stirred dry mixture was added 0.45 g of sodium hydride (58.1 percent dispersion in mineral oil, 11 m mol). After 5 min. of mixing, 0.75 ml of toluene diisocyanate (Hylene TM, 5.27 m mol) was added. The temperature was slowly raised to 165° C.–175° C. Agitation was continued until the temperature reached 120°–130° C. and the mixture became too viscous to stir.

The polymerization was carried out for 3 hrs. at 165°–175° C. Upon cooling, the copolymer was removed from the resin kettle and compounded by milling. The milling recipe contained 100 parts of the copolymer, 150 parts of silica 325 mesh, 1.5 parts of Dow-Corning Z6075 silane (vinyltriacetoxy silane), and 2.0 parts of Dicup R, manufactured by Hercules (dicumyl peroxide). After curing for 20 min. at 350° F., the compounded block copolymer gave the following physical properties; flexural strength of 16,210 psi, flexural modulus of $9.88 \times 10^5$ psi, Izod, notched of 0.38 ft.lbs per inch, Izod, unnotched of 4.2 ft.lbs per inch, Gardner impact strength of 3.7 inch lbs, heat distortion temperature at 264 psi of 220° C., and a Rockwell hardness E scale of 79.

EXAMPLE VIII

20/80—1,2-POLYBUTADIENE/NYLON-6

To a 500 ml stainless steel resin kettle was added 50.2 g of amine terminated 1,2-polybutadiene having 69.7 percent solids in hexane. The hexane was stripped off by heating to 100° C. under a stream of dry nitrogen. Then, 140 ml (140 g) of dry caprolactam was added as a melt at 100° C. to 115° C. The two components were stirred and 1.139 g of sodium hydride in mineral oil (40.7 g/mole sodium hydride or 0.028 mole sodium hydride) was added. After 1 to 5 min. of stirring, 2.0 ml of toluene diisocyanate (0.014 mole of Hylene TM) was added. After stirring for 5 min., the stirrer was removed from the reaction mixture and the temperature raised to 160° C.–170° C. and maintained for 3 hrs. The resulting sample was milled and a sample compounded. The compounded sample contained 100 parts of the nylon block copolymer, 80 parts of alumina trihydrate, 7.5 parts of ¼" No. 704.71 glass fiber, 1 part of $\alpha,\alpha'$-bis(t-butylperoxy) diisopropylbenzene, 1 part of 3-glycidoxypropyl trimethoxy silane (Dow Corning), and 1 part of silicone oil (DC 550). The compounded material was cured for 10 min. at 335° F. and gave the following properties: a flexural strength of 7,650 psi, a flexural modulus of $5.09 \times 10^5$ psi and Izod notched in ft.lbs per inch of 0.29, an Izod unnotched in ft.lbs per inch of 2.5, a Gardner impact in inch lbs of 2.25, a heat distortion temperature of 191° C. at 264 psi and a Rockwell E hardness of 34.

EXAMPLE IX

30/70—1,2-POLYBUTADIENE/POLYTOLUENEDIAMINE TEREPHTHALAMIDE

A 1 liter resin kettle was fitted with a turbine stirrer, thermometer, nitrogen inlet and distillation head and was then charged with 40.7 g of 1,2-polybutadiene amine terminated cement (73.5 percent solids in hexane) along with 500 ml of toluene and 33.9 g (0.277 moles) of 2,4-toluenediamine. The solution was heated to distill off the hexane and any water present. Upon the vapor temperature reaching 104° C., the mixture was cooled under nitrogen to room temperature and then down to −15° C. to −20° C. in a dry ice/carbon tetrachloride bath. A solution of 56.3 g (0.277 moles) of distilled terephthaloyl chloride and 125 ml of dry dimethylacetamide (DMAC) was prepared in an inert atmosphere (dry box). This solution was placed in a 150 ml addition funnel and the traces of acid chloride was rinsed into the funnel with 25 ml of DMAC. The addition funnel was stoppered and capped before exposure to air. The addition funnel replaced the distillation head on the resin kettle and the DMAC solution was added rapidly to the amine terminated 1,2-polybutadiene-TDA solution suspension. The reaction temperature was maintained at −15° C. to −20° C. for 6 hrs. after the initial exotherm (to +15° C.). The reaction mixture was then allowed to warm to room temperature and the polymer was then precipitated in methanol, collected by suction filtration and washed with ice water in a Waring Blender. The blended suspension was treated with sodium carbonate to remove traces of HCl and promote aggregation of the polymer dispersion. The polymer was collected by suction filtration, washed with water and then with methanol and dried in a vacuum for 16 hrs. at room temperature and then at 3 hrs. at 60° C. A yield of 93.2 percent was obtained. A portion of the polymer was compounded as follows: 50 g of the polymer, 75 g of silica (325 mesh), 2.0 g of dicumyl peroxide and 0.75 ml of vinyltriacetoxy silane. The compounded polymer was cured for 20 min. at 350° F. and gave the following properties: flexural strength of 8,720 psi, flexural modulus of $10.38 \times 10^5$ psi, Izod notched in ft.lbs per inch of 0.25, Izod unnotched in ft.lbs per inch of 1.0, Gardner impact in inch lbs of 1.5, heat distortion temperature at 264 psi of 250° C. and a Rockwell E hardness of 95.5. Thermal gravametric analysis (TGA) of a sample of the cured, compounded polymer shows only 4 percent weight loss in either air or nitrogen up to 438° C. Thus, a highly thermally stable thermoset resin has been produced.

As apparent from the above physical properties, an engineering-type thermoset was produced having an exceedingly high flexural modulus.

The 1,2-polybutadiene nylon block copolymers of the present invention have also been found to produce good engineering rigid thermoset foams. Moreover, it has been found that such foams may possess excellent flame retardancy by proper compounding. Additional advantages of such rigid foams include the facts that they may be made from putty-like material and therefore are readily processable or moldable, they do not present dust problems, water can readily be used as a blowing agent, thereby reducing health and safety hazards of processing, and that as a thermoset, relatively low processing temperatures such as below 300° F. must be utilized.

In contrast, generally all conventional thermoplastic foams require a high processing and blowing temperature. For example, polycarbonates and polyphenylene oxides require a processing temperature of about 500° F. to about 600° F. Considering thermoplastics which constitute the largest class of foams utilized, the foaming temperatures of polypropylene generally range from 340° F. to 550° F., and for polyphenylene sulfides from 600° F. to about 650° F. Considering the strength of various thermoset foams, phenolics and urea-formaldehyde tend to be friable and, therefore weak.

Thermoset foams according to the present invention having good flame retardant properties are formed by utilizing conventional curing agents such as peroxides or with other conventional curatives, for example, various sulfur curatives, as are well known to those skilled in the art, along with suitable and conventional flame retardants, various surfactants to obtain good bubble dispersion and size, various conventional blowing agents, and various fillers or reinforcing agents. Additionally, a coreactive monomer may or may not be added to the block copolymer. The block copolymer may generally comprise a diene rubber constituent made from a monomer as set forth above, for example, from a conjugated diene monomer having from 4 to 10 carbon atoms with a preferred rubber constituent including 1,2-polybutadiene; 1,4-polybutadiene; 1,4-polyisoprene; and a copolymer of 1,4-butadiene and styrene. The nylon constituent may be made from any nylon-forming monomer as previously set forth, that is, the lactams, and preferably from caprolactam or capryllactam. The resulting thermoset foams may vary from rigid to semi-rigid as well as highly flexible, non-rigid foams by variation in the level and type of rubber curatives employed and the block copolymer composition.

Additionally, thermoplastic rigid foams may also be prepared from the various block copolymers disclosed hereinabove when the amine terminated polymer portion of the copolymer is made from monomers via an anionic polymerization such as vinyl substituted aromatics or heteroaromatics, as set forth above. Of these various monomers, styrene, alpha-methylstyrene, vinyltoluene and 4-t-butylstyrene are preferred. Such thermoplastic block copolymer rigid foams will require high processing and blowing temperatures characteristic of conventional thermoplastic foams. The nylon constituent of the rigid foams may be made from any of the above-set forth monomers with caprolactam and capryllactam being preferred. Moreover, the various compounds which may be utilized in the preparation of these rigid thermoplastic foams are the same, such as the flame retardants, the surfactants, the blowing agents, and the like. However, when a rigid foam is prepared without utilizing a coreactive monomer, a curing agent such as a peroxide type or a sulfur type is not required.

The amount of the coreactive monomer for preparation of either the thermoplastic foams or the rigid thermoplastic foams based upon 100 parts by weight of the block copolymer will be zero or nothing if a coreactive monomer is not utilized, or otherwise will range from about 1 to about 150 parts and preferably from about 1 to about 20 parts since the coreactive monomer generally decreases the viscosity of the composition. If too much coreactive monomer is utilized, the foam becomes soft or non-rigid, and exhibits reduced flame retardancy and generally lower physical properties. Specific examples of coreactive monomers include styrene, vinyltoluene, chlorostyrene, 4-t-butylstyrene, diallyphthalate, and the like.

The range of the curing agent, be it peroxide or a sulfur-type curative, is from about 1 to about 40 parts with from about 2 to about 6 parts being preferred. In general, any conventional peroxide curing agent may be utilized as well known to those skilled in the art with dicumyl peroxide being preferred. Should Dicup 40 be utilized, a larger overall weight amount is generally utilized due, of course, to the fact that such peroxide contains only about 40 percent dicumyl peroxide by weight. Similarly, any conventional sulfur compound or sulfur cure system known to the art may also be utilized such as the following cure system.

|  | [Parts/100 pts. rubber (copolymer)] |
|---|---|
| Sulfur | 2.0 pts. |
| Stearic acid | 2.0 pts. |
| Zinc Oxide | 5.0 pts. |
| Santocure NS (N-t-butyl-2- | 1.2 pts. |
| benzothiazolesulfenamide) | |

Considering the flame retardant, generally from 0 to 150 parts and preferably from 50 to about 100 parts of any conventional flame-retardant compound may be utilized. Specific examples include Thermoguard S 711, M and T Chemical Company (antimony trioxide), Dow FR 300 BA (decabromo dipheny oxide), and alumina trihydrate. Generally, amounts at the lower end of the ranges are desired since, otherwise, the density tends to increase and the various physical properties tend to decrease.

The general range of the surfactants is from 0.1 to about 5 parts with a preferred range of about 0.2 to about 2 parts. These ranges generally provide a good distribution of bubbles as well as bubble size whereas smaller amounts tend to produce a poor dispersion of cell size. On the other hand, excess amounts tend to cause collapse of the bubbles or voids. Any conventional surfactant may be utilized either alone or in combination with each other and a specifically preferred surfactant is SF 1034, a silicone surfactant manufactured by General Electric Company.

The general range of the blowing agent to produce the foam is from about 0.5 to about 50 parts by weight and preferably from about 1.0 to about 7.5 parts if a chemical blowing agent is utilized or preferably from 5.0 to about 20 parts if a physical blowing agent is utilized. Many conventional blowing agents may be utilized. Generally, for thermoset copolymer foams, high decomposition temperatures for effective gas yield wherein the decomposition temperature is 150° C. or over are not preferred and compounds having a decomposition temperature of 175° C. and over tend to be incompatible with the process. A preferred blowing agent is Nitrosan manufactured by DuPont, (N,N'-dimethyl-N,N'-dinitroso terephthalamide). Other blowing agents include azobisisobutyronitrile, p,p'-oxybis(-benzene sulfonyl hydrazine), azodicarbonamide in conjunction with various decomposition activators known in the art, or dinitroso pentamethylenetetramine in conjunction with various decomposition activators known in the art. Azodicarboxylates are not desired as chemical blowing agents since they tend to undergo an "ene" reaction with double bonds from polybutadiene or other unsaturated portions of the amine terminated polymer at temperatures lower than their effective gas yield temperatures. In general, the effective gas yield temperature of the chemical blowing agents or the boiling point of the physical blowing agents are generally equal to or preferably lower than the temperature at which the particular peroxide has a half life of about 30 minutes or over. Activators may be utilized with certain chemical blowing agents to lower the decomposition or effective gas yield temperatures of the chemical blowing agent to the desired temperature range as is well known to those skilled in the art.

Generally, physical blowing agents which are preferred for thermoset foams are those which are compatible or dispersable within the resin formulation and do not interfere with the free radical cure of the resin. As for example, pentane, hexane, heptane, water, and the like, as well as injected inert gases such as nitrogen, neon, and argon. For thermoplastic copolymer foams, the chemical blowing agents preferred are those with effective gas yields at decomposition temperatures from about 100° C. to about 225° C. Activators known to those well skilled in the art may be utilized to obtain the desirable gas yield at the processing temperatures of the thermoplastic copolymers. Generally, those chemical blowing agents, with or without activators, which are utilized in conventional thermoplastic foams are preferred. The azodicarboxylates may also be used since the thermoplastic copolymers described above do not contain double bonds which would readily undergo an "ene" reaction. The physical blowing agents which are preferred for thermoplastic copolymer foams are generally those cited above for thermoset copolymer foams, as well as the various common and conventional Freons (that is, partially or totally fluoronated and sometimes partially or totally chloronated hydrocarbons having a boiling point of less than 100° C. at 760 mm of mercury), methylchloride, ethylchloride, methylene chloride and chloroform. Further examples of conventional chemical and physical agents which may be utilized are set forth in the following articles which are hereby full incorporated by reference. "Description of Ideal Blowing Agents", H. R. Lasman, *Modern Plastics Encyclopedia* (1971), p. 158 et seq.; and "A Selection Guide to Blowing Agents for Structural Foam Molding", R. C. LaClair, *Plastic Technology*, March (1976), p. 31.

The general range of the fillers or reinforcing agents is from about 0 to about 150 parts and preferably from about 0 to 50 parts. Usually, amounts in excess of these ranges are not desirable since the formulations are rather stiff and do not readily flow under the internal gas pressure to give good foams. Various conventional fillers, well known to those skilled in the art, may be utilized such as silica, alumina, chopped glass fibers, and the like.

The flame retardant rigid foam utility of the 1,2-polybutadiene nylon block copolymers will be better understood from the following examples and data.

EXAMPLE X

| | |
|---|---|
| 1,2-PBd/Nylon-6 33/67 | 100 pts. |
| Vinyltoluene | 10 pts. |
| Dicup R | 4 pts. |
| Thermoguard S711 ($Sb_2O_3$- M & T Chemical) | 10 pts. |
| FR 300 BA (Decabromo Diphenyloxide, Dow Chemical Company) | 20 pts. |
| Alumina trihydrate | 50 pts. |
| Nitrosan (Dupont)* | 2 pts. |
| SF1034 (Silicone Surfactant, G.E.)** | 1 pt. |

*N,N'-dimethyl-N,N'-dinitroso-terephthalamide
**Dimethylpolysiloxane and polyoxyalkylene copolymer The above formulation was thoroughly mixed and 50 g of the formulation was cured in a cylindrical mold under atmospheric pressure. The sample was heated at 120° C. for 40 min. and then at 177° C. for 5 min. to rapidly cure the 1,2-polybutadiene portion. The resulting free rise, rigid foam had a density of approximately 0.85 g/cc and floated in toluene. A thin slice (1/16 to 3/32 inches thick) of the foam would burn when held in the flame of a Meeker burner but self-extinguished upon removal from the flame. The slice did not drip either in the flame or after removal from the flame.

In a similar formulation, wherein an amount of the block copolymer containing an equilibrium concentration of water, was compounded 2 parts of Dicup R. A 40 g sample was heated in a cylindrical mold for 2 hrs. at 300° F. The resultant foam had a density of approximately 0.8 g/cc and contained an even distribution of fine cells.

EXAMPLE XI

In a manner similar to Example X, the following formulation was cured at 300° F. for 60 min. in a 3"×1"×¼" mold.

| | | |
|---|---|---|
| 1,2-PBd/Nylon-6 33/67 | 100 | pt. |
| Styrene | 25 | pt. |
| Dicup R | 5 | pt. |
| 1/32" milled glass fiber | 31.25 | pt. |
| G. E. SP1034 | 0.75 | pt. |
| Z6075 silane | 0.5 | pt. |
| Notrosan | 0.8 | pt. |

The density was approximately 1.1 g/cc. The thermoset foam exhibited a Rockwell M hardness of 54, a flexural modulus of $4.27 \times 10^5$ psi and a flexural strength of 6,150 psi.

EXAMPLE XII

In a manner similar to EXAMPLE XI, the following formulation was heated in a 3"×1"×¼" mold for 60 min. at 300° F. to produce a thermoset foam having a density of approximately 0.62 g/cc. This foam gave a Rockwell R hardness of 40, a flexural modulus of $1.15 \times 10^5$ psi and a flexural strength of 2,280 psi.

The formulation was as follows:

| | |
|---|---|
| 1,2-PBd/Nylon-6 33/67 | 100 pt. |
| Styrene | 25 pt. |
| Dicup R | 5 pt. |
| G.E. SF1034 | 0.75 pt. |
| Nitrosan | 0.8 pt. |

As apparent from these examples, self-extinquishing or non-burning rigid thermoset foams were produced having good physical properties.

The urea-aldehyde and the phenol-aldehyde compounds and the like constitute another class of monomers, prepolymers and polymers which are amine reactive and can be utilized to produce largely graft copolymers when reacted with the amine terminated polymers, with the monomers and prepolymers being highly preferred due to ease of preparation and better physical properties.

Considering now the non-amine terminated constituent, generally, any condensation polymer can be used. For example, in lieu of the formaldehyde portion of the urea-formaldehyde consituent, any linear alkyl aldehyde can be utilized having from 1 to about 15 carbon atoms such as acetaldehyde, propionaldehyde, n-butyladehyde, n-valderaldehyde, n-caproaldehyde, n-heptaldehyde and the like. Formaldehyde and acetaldehyde are highly preferred. Additionally, furfuryl aldehyde and hexamethylene tetramine may also be used. With respect to the urea compound portion of the constituent, generally, urea and melamine can be utilized and are preferred. Urea having small hydrocarbon substituents, that is, from 1 to 4 carbon atoms, may also be utilized such as 1,3-dimethylurea and 1,3-diethylurea as well as urea alcohols having 1 to 5 carbon atoms such as dimethylol-urea.

With respect to the phenolic compound, generally any phenol-type compound having 2 of the 3 ortho and para positions open may be utilized including, of course, phenol. Thus, alkyl phenols such as butyl phenol, the cresols, the dihydric phenols such as resorcinol, catechol and quinol, may be utilized as well as many other compounds. Of course, a substituted phenol having any substituted group which would promote other reactions of interfere with the desired polymerization is not desired.

Considering the polyvinyl alcohols, any of the polyvinyl alcohol polymers or copolymers which are reactive with aldehydes or ketones to form acetals or ketals may be used. Examples of such reactive aldehydes and ketones may be found in *Polyvinyl Alcohol* by C. A. Finch, Ed. pp 194-202, John Wiley and Sons, New York, New York (1973), which is hereby incorporated by reference. Most preferred are the aliphatic aldehydes having from 1 to 4 carbon atoms, particularly formaldehyde, acetaldehyde or butyraldehyde.

In the formation of urea-aldehyde type block copolymers or the phenol-aldehyde type block copolymers, aldehydes such as the chemically active formaldehyde and the less active acetaldehyde will react with the amine compound of the amine terminated polymers. The remaining portion of the block copolymer may be formed largely in accordance with conventional practice.

Thus, under the influence of either acid or base catalysts, phenol-type compounds can be reacted with aldehyde-type compounds to give phenol-aldehyde copolymers. The first step in the reaction is generally the addition of aldehydes to the ortho or para position of the phenols and, of course, at least 2 free positions are required on the phenol compound in order to permit polymerization. The next step is the novolac formation in which low molecular weight polymers are formed, generally in the presence of an acid catalyst. In the next step or resole formation, the methylol phenols can condense through formation of either methylene linkages or ether linkages in the presence of alkaline catalysts and more aldehyde. In the last stage, decomposition of the ether bridges to methylene bridges yields the copolymer. Due largely to the random reaction and the presence of often more than two reactive positions on the phenol, graft copolymers are generally formed having high molecular weights and, therefore, are rarely processed.

Due to the formation of resoles and novolacs, the production of phenol-aldehyde copolymers can be made by one stage or two stage processes. In the production of a one stage copolymer, all the necessary reactants such as phenol, aldehydes, catalysts, and the like are charged into a resin kettle and reacted together. Any conventional alkaline catalyst can be utilized and the mole ratio of aldehydes such as formaldehyde to phenol is about 1.25-2.25 to 1. In the two-stage process, the resins are made utilizing any conventional acid catalyst and only a part of the necessary aldehyde is added to the kettle utilizing mole ratio of about 0.8 to 1. The rest is added at a later point in time, often in the form of hexamethylenetramine, which decomposes in the final curing step with heat and moisture present to yield formaldehyde and ammonia; the latter acts as a catalyst for curing.

With respect to the formation of urea-type aldehyde copolymers, these can generally be formed according to conventional practice once the amine terminated polymer has been reacted with an aldehyde such as formaldehyde. Although the polymerization utilizing urea or melamine will be discussed, generally the other urea-type monomers set forth above can be polymerized in a similar manner. Initially, the aldehyde-type compound reacts with either urea or melamine first by addition to form methylol compounds and then by condensation in reactions much like those of phenol and formaldehyde. Usually, the production of the amino resins is similar to that of the phenol-aldehyde-type resins. The mole ratio of aldehyde to melamine may be from about 1.0-3.0 to 1 whereas for urea, the ratio is from about 0.1-1.5 to 1.

The temperatures of polymerization are generally from about 90° C. to about 100° C. for phenol-formaldehyde actions and from about ambient temperatures to about 60° C. for urea or melamine-aldehyde reactions. Normally, the only pressure is that generated by the solvent system. Since the urea or melamine-type system also tends to produce graft copolymers, the phenol copolymers or the urea copolymers will be branched and, therefore, of very high molecular weights, such as from about 50,000 to 300,000 plus, or they will be cross-linked.

It has been found that the range of the amine polymer constituent such as polybutadiene with either the urea-aldehyde-type or phenol-aldehyde-type copolymer can range from about 5 percent to about 95 percent with from 25 percent to about 75 percent being preferred. The amine terminated phenol-aldehyde block copolymer generally has the properties of a thermoset and may be used as molding resins for potting compounds due to their good dielectric properties. Other uses are laminating resins, bonding resins, coatings, adhesives, and the like. The amine terminated urea-aldehyde-type block copolymers may be utilized as molding resins, adhesives, laminating resins, and the like. Generally, either type of block copolymer may incorporate various filling and reinforcing agents such as silica, glass, and the like, with the urea-aldehyde compounds also often being cellulose filled. Additionally, block copolymers according to the present invention tend to form smoother finishes when the amine terminated constituent is an elastomer such as polybutadiene. Moreover, the phenolic-aldehyde block copolymers are well suited as curatives for contact-adhesive formulations, replacing alkyl substituted phenolic curative compounds which are utilized in conventional adhesives.

The invention will be better understood by reference to the following examples.

EXAMPLE XIII

75/25—1,2-POLYBUTADIENE UREA-FORMALDEHYDE

A 2 liter resin kettle equipped with a mechanical stirrer, thermometer, nitrogen inlet and distillation head was charged with 294 g of a hexane cement of amine terminated 1,2-polybutadiene having a molecular weight of about 25,000 (50.6 percent solids or 150.0 g polymer). One liter of heptane was added and the mixture distilled to remove the hexane and any water present until the vapor temperature reached approximately 95° C. Upon cooling, an additional 100 ml of heptane and 63 ml of 37 percent formalin (25 g of formaldehyde) as well as 0.5 g of sodium hydroxide was added. The distillation head was replaced with a Dean-Stark water separator and reflux condenser. The mixture was heated to a reflux for about ½ hr. and then 25 g of crystal urea and 25 ml of water were added. Reflux was continued for an additional 1½ hrs. The mixture was neutralized by the addition of 0.35 ml of 85 percent phosphoric acid (25.15 m mol) and reflux was continued overnight (about 18 hrs). The total water removed by azeotropic distillation was 70 ml (67.5 ml expected from 25 ml of water and 63 ml of formalin charged). The resin was recovered by precipitation in 1,200 ml of isopropanol. The supernatant isopropanol solution was decanted and the polymer was dried in a vacuum for about 60 hours to give 197.1 g (98.5 percent yield based upon charged materials). The urea-formaldehyde block copolymer was compounded with wood fiber as follows: 100 parts of block copolymer, 100 parts of wood fiber and 2 parts of Dicup R. Samples were molded and cured for 4 hrs. at 270° C. to give the following physical properties: flexural strength of 8,490 psi, flexural modulus of $4.91 \times 10^5$ psi, Izod, notched in ft. lbs/inch of 0.65, Izod, unnotched in ft.lbs/inch of 2.10, Gardner impact in inch lbs. of 2.65 and Rockwell E hardness of 55.

EXAMPLE XIV

25/75—1,2-POLYBUTADIENE/PHENOL-FORMALDEHYDE BLOCK COPOLYMER

A 2 liter resin kettle was fitted with a turbine agitator, a nitrogen inlet, a thermometer and a reflux condenser. The resin kettle was charged with 500 ml of hexane and 100 g of 1,2-polybutadiene amine terminated polymer (50.6 percent solids in hexane MW 25,000). This mixture was stirred to dissolve and then 100 ml of formalin (37 wt percent or 40 g $CH_2O$ charged) was added. After stirring to mix well, 60 g of sodium hydroxide and 94.1 g of molten phenol were added. The entire mixture was heated with stirring to reflux (63° C.) for 2½ hr. The initial rose-white color faded to a white during the first 30 min. The apparatus was modified by the addition of a Dean-Stark water separator between the resin kettle and the reflux condenser and water was removed by azeotropic distillation. After 3 hrs., 1.0 g of DABCO (1,4-Diaza [2-2-2]-bicyclooctane) was added and reflux with water removal was continued. After 19 hrs., 50 ml of water had been removed; the reaction was cooled and 50 ml (20 g $CH_2O$) of formalin was added. The reaction was again heated to reflux and after a total reflux time of 20.5 hrs., an additional 1.0 g of sodium hydroxide was added. At the end of 45 hrs., reflux, the total water collected was 115 ml.

The product was isolated by coagulation in isopropanol, washed twice with methanol and dried in vacuo. The yield was 138.5 g (67.7 percent of materials charged). The dried stock was mixed on a two roll mill to insure homogeneity and then compounded and cured as shown below.

| Compounding of 25/75 - 1,2-PBdNH$_2$/Phenol-Formaldehdye | | | |
|---|---|---|---|
| | 1 | 2 | 3 |
| 1,2-PBdNH$_2$/Phenolic | 100 pt. | 100 pt. | 100 pt. |
| Wood fiber | 100 pt. | 100 pt. | — |
| Silica (325 mesh) | — | — | 150 pt. |
| Silane Z 6075 | — | — | 1.5 pt. |
| Dicup R | — | 2 pt. | 2 pt. |
| Cure | 4 hr at 270° F. | 20 hr at 350° F. | 20 hr at 350° F. |

| Physical Properties of 1,2-PBdNH$_2$/Phenol-Formaldehyde | | | |
|---|---|---|---|
| | 1 | 2 | 3 |
| Flexural Strength $\times 10^{-3}$ psi | 0.76 | 11.99 | 11.17 |
| Flex. Mod. $\times 10^{-5}$ psi | 0.78 | 8.54 | 9.97 |
| Izod, Notched ft.lb/inch | 0.67 | 0.34 | 0.28 |
| Izod, Unnotched ft.lb/inch | 1.3 | 1.7 | 1.7 |
| Gardner Impact inch lbs. | 4.9 | 3.8 | 1.6 |
| Rockwell Hardness | R41 | E64 | E84 |

EXAMPLE XV

25/75—1,2-POLYBUTADIENE/PHENOL-FORMALDEHYDE BLOCK COPOLYMER

In a manner similar to the formation of a block copolymer in Example XIV, a 1,2-polybutadiene/phenol-formaldehyde block copolymer was prepared. When 100 parts of resin was compounded with 100 parts of wood fiber and 1.2 parts of Dicup R, and then cured for 3 hrs. at 300° F., a Rockwell E hardness of 46 was obtained. When another sample was cured for 20 mins. at 350° F., a Rockwell E hardness of 46 was also obtained.

A particular end use of the 1,2-polybutadiene/urea-formaldehyde copolymers or the 1,2-polybutadiene/phenol-formaldehyde copolymers prepared from the amine terminated polymer as described above is a waterproof adhesive material for bonding various items together such as wood to wood, wood to metal, metal to metal, and the like. In general, such copolymers are prepared as hereinabove described and may contain from 5 percent to about 95 percent of the 1,2-polybutadiene constituent. Amounts in excess of 95 percent result in poor adhesion. A preferred amount of the 1,2-polybutadiene constituent ranges from about 25 percent to about 75 percent. Other elastomer constituents may also be used but polybutadiene is preferred due to economic reasons. Concerning the condensation polymer-portion constituent, generally any condensation polymer can be used.

The urea-formaldehyde or the phenol-formaldehyde elastomeric copolymer adhesives of the present invention are ideally suited for tailer-made operations in that the copolymers are of putty-like consistency and therefore are easily handled and processed. Such copolymer adhesives furthermore obviate any dust problems normally encountered with conventional urea-formaldehyde adhesives and also exhibit excellent water resistance.

The adhesive utility of 1,2-polybutadiene/urea-formaldehyde copolymers as well as 1,2-polybutadiene/phenol-formaldehyde copolymers will be better understood by the following example.

EXAMPLE XVI

PREPARATION OF 1,2-POLYBUTADIENE/PHENOL-FORMALDEHYDE ADHESIVE COPOLYMER (25 Percent PBd/75 Percent Phenol-formaldehyde)

A 200 g sample of amine terminated 1,2-polybutadiene in hexane (50.6 percent solids, or 101.2 g of polymer) made in accordance with the above disclosure was added to a resin kettle equipped with a mechanical stirrer. The kettle was heated to drive off some of the hexane and 1 liter of toluene was added. The solvent was then distilled until a vapor temperature of 94° C. to 96° C. was achieved. The kettle was then cooled below 70° C. and 200 ml of formalin (40 percent formaldehyde in water), and 2.0 g of sodium hydroxide was added. The solution was heated to 70° C.–80° C. for 30 mins.

(under total reflux), and 188.2 g of molten phenol and 2.0 g of DABCO (diaza[2·2·2]bicyclo-octane) were added. The kettle was stirred overnight, then fitted with a Dean-Stark trap and heated to remove 100 ml of water, cooled, and then an additional 100 ml of formalin was added. The kettle was refluxed overnight to remove an additional 200 cc of water. The solution was dried under a vacuum to give 341.2 g of copolymer (83.5 percent yield based on charged materials).

To 5 g of dried copolymer was added 10 g of toluene and 0.1 g of dicumyl peroxide. Several segments of wood tongue depressors (3 in. long, 13/16 in. wide, 3/32 in. thick) were glued together with a 1 in. overlap. The adhesive was cured for 3 hrs. at 150° C. under various pressures and the adhesive strength determined. Similarly, a 75/25 percent 1,2-PBd/phenol-formaldehyde adhesive and a 75/25 1,2-PBd/urea-formaldehyde copolymer were prepared and used to glue the tongue depressors together utilizing a dicumyl peroxide cure. The results are set forth in Table II.

TABLE II

| COMPOUND | 1 | 2 | 3 | 4 | 5 | 6 | 7 |
|---|---|---|---|---|---|---|---|
| 25/75 - 1,2-PBd/phenol formaldehyde | | | 100$^a$ | | | | |
| 75/25 - 1,2-PBd/phenol formaldehyde | 100 | | | 100 | | 100$^b$ | |
| 75/25 - 1,2-Pbd/urea formaldehyde | | 100 | | | 100 | | 100$^b$ |
| Dicumyl peroxide, 40 percent, | 10 | 10 | 2$^a$ | 10 | 10 | 10 | 10 |
| Cure Pressure, psi | 300 | 30 | 500 | 2,000 | 200 | 1,000 | 1,000 |
| Average tensile strength in pounds | 277 | 161 | 312 | 640 | 529 | 413 | 552 |

$^a$Stock prepared as a solution/suspension in 200 parts of toluene using Dicup R, then air cured for 72 hrs. and subsequently cured for 20 hrs. at 350° C. under 500 psi pressure.
$^b$Refluxed in water for 20 hrs. before testing.

As readily indicated by the above data, fairly good tensile strength was obtained and the phenol formaldehyde and urea formaldehyde copolymers exhibited excellent water resistance, that is, they were insensitive to boiling water degradation.

EPOXY COPOLYMERS

As previously noted, the above-described amine terminated polymers can be readily reacted with various epoxy-forming monomers or prepolymers to yield either block copolymers, graft copolymers, or mixtures thereof. That is, if the amine terminated polymers are reacted with solely epoxy-forming monomers or with solely epoxy prepolymers, typically containing epoxide end groups such as acid-generated epoxy compounds, the end portion of the amine terminated polymer will react with the epoxide end groups and form a block copolymer, usually of the ABA-type structure wherein A is the amine terminated polymer. However, should epoxy monomers or the epoxy prepolymer also contain a conventional epoxy curing agent, largely graft copolymers will be formed wherein the epoxy polymer constitutes the backbone and the amine terminated polymer constitutes the pendant portions of branches. As well known to those skilled in the art, the epoxy curing agents add to the epoxy ring generating a hydroxyl group which can then further react with more epoxy groups to extend the molecular weight. Of course, the presence of poly-epoxy compounds will result in the production of a highly branched and eventually crosslinked material. The amine terminated polymer, by virtue of its primary amine group, is a curing agent for epoxy compounds and will, thus, be bound to the epoxy resin constituent. Generally, unless exceedingly large amounts of an epoxy curing agent are utilized, the resulting composition will contain a mixture of epoxy graft copolymers, epoxy block copolymers, as well as epoxy copolymers which have blocked to at least one end thereof an amine terminated polymer, as well as amine terminated polymers grafted onto at least one point of the epoxy copolymer backbone.

Generally, any epoxy-forming monomers or epoxy prepolymers which can react with an amine group may be utilized in the present invention. Various epoxy-forming monomers or prepolymers which may be utilized are those described in the *Encyclopedia of Polymer Science and Technology*, Interscience Publishers, New York (1967) Volume 6, Pages 212 through 221, which is hereby fully incorporated by reference. Examples of further epoxy prepolymers or resins are set forth in the *Handbook of Epoxy Resins*, McGraw-Hill, New York (1967) by H. Lee and K. Neville, Chapters 2 and 3, which is also fully incorporated by reference. Desirable epoxy prepolymers or resins are those made by the condensation reaction of epichlorohydrin with bisphenol A(1,2-diphenylol propane). As well known to those skilled in the art, generally, an excess of epichlorohydrin is used to leave epoxy groups on the end of the polymer. In lieu of bisphenol A, other hydroxyl containing compounds may be utilized including resorcinol, hydroquinone, the various diols such as ethylene glycol, 1,4-butane diol, 1,3-propane diol, glycerol, and novalac resins derived from phenol and aldehydes. Epoxides formed by the action of peracids or peresters on olefinically unsaturated compounds may also be utilized. Examples include epoxidized soy bean oil, butadiene diepoxide, dicyclopentadiene diepoxide, cyclohexene oxide or epoxidized castor oil. Although epoxides other than those derived from epichlorohydrin may be utilized, such as aliphatic epoxides, they tend to be costly and, thus, are less desirable as a practical matter. The equivalent weight of the epoxy resin per unreacted epoxy group is generally in excess of 40 and preferably in excess of 80. The resins may be made in any conventional manner and specific examples of some desired epoxy resins which are available on a commercial basis are those manufactured by the Shell Chemical Company under the trademark of EPON, specifically, as Epon Resins 812, 871, 872, 828, 1004, 152, 154 and 1031.

The amine terminated epoxy polymer compositions, whether block, graft, or mixtures thereof, are very readily formed simply by adding the amine termination polymers to epoxy prepolymer resins and mixing at a temperature above the softening temperature of the epoxy resin, as from about ambient temperature to about 200° C., or at room temperature in a solution. Alternatively, the epoxy resin may be formed in situ by adding amine terminated polymers to epoxy forming monomers along with any other desirable additives such as epoxy catalysts, epoxy curing agents, and the like. Generally, the in situ epoxy polymerization, as well as the reaction between the epoxy prepolymers or resins and the amine terminated polymers, proceeds at ambient temperatures. Heat may be applied to increase the reaction rate as well as to cure the epoxy polymers. A suitable temperature range, therefore, extends from ambient temperatures to about 200° C. with a preferred range being from about 50° C. to about 150° C. The amount of epoxy polymer based upon the total weight of the copolymer composition, that is without any crosslinking, may range from as little as 1 percent by weight up to about 95 percent by weight with from about 2 percent to about 75 percent being preferred and is readily controlled simply by adding a desirable amount of epoxy-forming monomers or epoxy copolymer resins of a known equivalent weight to a desired or calculated amount of amine terminated polymer. Although the epoxy copolymers are readily processable at ambient temperatures in that they may be milled, extruded, injection molded, and the like, upon curing, they generally exhibit the physical properties of cured epoxy polymers. Thus, copolymers having a very low content of epoxy resin therein, such as 1 percent or more, exhibit good adhesion properties whereas copolymers having a very high amount of epoxy resin, such as 80 or 90 percent, exhibit high impact strength. Copolymers having an epoxy content between the values, vary accordingly in their physical properties.

The properties will also tend to vary a bit with regard to the polymer constituent of the amine terminated polymer. Although any of the polymers may be utilized as set forth above, amine terminated polymers made from conjugated dienes having from 4 to 12 carbon atoms and desirably from 4 to 8 carbon atoms are preferred with butadiene and isoprene being highly preferred. Additionally, vinyl substituted aromatic compounds are also preferred with specific preferred examples of monomers being styrene, vinyltoluene, alpha-methylstyrene and 4-t-butylstyrene. Additionally, copolymers made from the conjugated dienes and the vinyl substituted aromatics are also desirable with a highly preferred copolymer being from styrene and butadiene. When a flexible amine terminated polymer is utilized such as 1,4-polybutadiene with a high amount of epoxy resin constituent such as 75-95 percent, the copolymer cured through the epoxy segments exhibits good impact resistance and flexibility. In contrast, when the amine terminated polymer constituent is easily cured to a rigid network such as 1,2-polybutadiene, the epoxy copolymer may be cured in both of its constituent phases to give a hard, rigid, thermoset plastic. If the amine terminated polymer constituent is prepared from thermoplastic-type monomers, such as vinyl substituted aromatics and vinyl substituted heteroaromatics, the epoxy copolymer can be cured in the epoxy constituent phase and the resultant cured copolymer will contain thermoplastic domains which will act predominantly as reinforcing fillers at temperatures up to the softening point of the thermoplastic amine terminated polymer.

If the epoxy constituent of the copolymer is formed in situ, suitable amounts of conventional catalysts and curing agents may be utilized. For example, based upon 100 parts by weight of the epoxy polymer, from 0.1 to 4.0 parts of a curing agent may be used. Typical curing agents include polyamides, polysulfides, urea and phenol-formaldehyde, as well as polyamines, and preferably polycarboxylic acids or acid anhydrides. Examples of common or conventional curing agents are set forth in the *Handbook of Epoxy Resins* by Lee & Neville, Supra., particularly in Chapters 5 through 12 which are hereby fully incorporated by reference. Examples of specific and desirable agents include Nadic methylanhydride (methyl-2,3-dicarboxy[1.2.2]bicycloheptene anhydride), phthalic anhydride, maleic anhydride, succinic anhydride, pyromellitic dianhydride, benzophenonetetracarboxylic dianhydride, trimellitic anhydride, hexachloro-2,3-dicarboxy[1.2.2]bicycloheptane anhydride; the polymethylene diamines [e.g., $H_2N-(CH_2)_n-NH_2$], wherein n is 2 to 15 and preferably 2 to 6; xylene diamines; polyamines from ethylene imide [e.g., $H_2N-(CH_2CH_2NH)_n-CH_2CH_2NH_2$], where n is 2 to 15, with an n value of 2 to 5 being highly preferred, m-phenylene diamine, 4,4'-methylene dianiline, diaminodiphenylsulfone, hexamethylene tetramine, dimethylol urea, urea-formaldehyde resins, melamine, and phenol-formaldehyde resins. The cure, as set forth in Lee and Neville, generally occurs through coupling or condensation reactions of any of the hydroxyl groups contained in the backbone of the formed epoxy polymer.

Conventional catalysts may be utilized to promote the in situ polymerization of the epoxy-forming monomers, such as benzyl dimethylamine; 1,4-diaza[2.2.2-]bicyclooctane, tri-n-alkanol amines with triethanolamine [$N-(CH_2CH_2OH)_3$]being highly preferred, Lewis acid and complexes thereof, and complexes of $BF_3$ (e.g., $BF_3$, diethyl ether). Moreover, any of the catalysts may be utilized which are set forth in Lee and Neville, Supra., Chapter 13, which is hereby fully incorporated by reference. Various conventional additives may be utilized such as various colorants, diluents, flexibilizers, stabilizers, fillers, and the like. Conventional fillers include glass powders, metal powders, various silicas, and fibers to which the epoxy materials have good adhesion and produce composites with excellent physical properties. If desired, carbon black may be added. Moreover, various coupling agents may be used in conjunction with the fillers. Examples of specific silanes include N-beta(N-vinylbenzylaminoethyl)-gamma-aminopropyltrimethoxysilane hydrogen chloride, 3-chloropropyltrimethoxysilane, 3-glycidoxypropyltrimethoxysilane, N-(2-aminoethyl-N'-2-aminoethyl)-3-propyltrimethoxysilane, and vinyltriacetroxysilane.

Generally, the preparation or addition of the various compounds, curing agents, catalysts, fillers, and the like, may take place in a suitable mixing vessel such as a Brabender or the like wherein the various compounds are simply mixed, with the formation of the copolymers being carried out at ambient temperatures, if desirable. In accordance with generally accepted procedures for the preparation of epoxy polymers, there is no need for solvents although, if desired, a non-polar solvent such as toluene may be utilized. After mixing, the toluene is generally stripped as by heating or applying a vacuum.

Although a chemical bond between the amine group and the epoxide group is formed during the preparation of the copolymers, discontinuous phases do exist between the generally polar epoxy portion of the polymer and the generally non-polar amine terminated portions such as a rubber or vinyl compound. However, the compatibility of the two phases is generally good.

In addition to the epoxy cure, common and conventional curing agents may be utilized to crosslink a rubber-type amine terminated polymer. Thus, sulfur compounds, organic peroxide compounds such as dicumyl peroxide, and the like, may be utilized to cure the amine terminated polymer when it is made from the preferred rubber-type monomers. Generally, a curing agent is selected such that it cures in the same general temperature range as the epoxy curing agent. Of course, due to the highly crosslinking nature of the epoxy copolymers with crosslinks establishing through both the amine polymer as well as the epoxy polymers, the final product is highly gelled and, hence, is a thermoset resin.

The epoxy copolymer may generally be used in the same applications as epoxy polymers, such as surface-coating materials, wherein toughness, adhesion and chemical resistance are required, with fillers such as glass fibers to make glass fiber-reinforced articles for electrical insulating items and the like. In addition to casting, potting, encapsulation and embedment techniques as practiced with epoxy resins, the copolymers, due to their great ease of processability at ambient temperatures, may also be used for extruding, injection molding, blow molding, and the like.

The invention will be better understood by the following examples.

A copolymer of an amine terminated 1,2-polybutadiene-epoxy resin was prepared by mixing 16 g of Shell Epon 1004 epoxy resin with 100 g of an amine terminated 1,2-polybutadiene (prepared as set forth in Example V) at 90°–100° C. for 30 mins. Based upon the amine content of the amine terminated 1,2-polybutadiene and the equivalent weight of the Epon 1004, there were two epoxy groups charged for each amine present. This copolymer (Dienoxy A) was then utilized in the formation glass fabric laminates and in the preparation of a 1,2-polybutadiene graft epoxy copolymer.

GLASS FABRIC LAMINATES

The following procedure was utilized to prepare glass fabric laminates.

A dip was prepared by dissolving the indicated 1,2-polybutadiene resin in toluene to give 30 percent solids. The dicumyl peroxide was dissolved at this time. The below-identified silane coupling agent was added and dispersed in the dip by shaking. Strips of glass fabric (Burlington 7781) were cut 3 in. wide by 38 in. long with the warp threads (strong direction) running across the narrow dimension. The glass fabric strips were weighed, then passed slowly through a shallow trough containing the dip. The excess dip was removed by wiping the impregnated fabric strip with parallel aluminum rods separated by a 0.08 inch gap. After air drying to remove most of the solvent, the impregnated fabric strips were dried in vacuo at room temperature for 3 hrs. Test specimens were molded by laminating ten plies of "prepreg" with all warp threads laid in parallel. The samples were cured 6 min. at 350° F. in a preheated positive pressure mold. The flexural test samples were cut from the cured laminate such that the warp direction ran the length of the sample.

EPOXY COPOLYMERS

By use of the Dienoxy A copolymer described above, a 1,2-polybutadiene epoxy copolymer composition of approximately 33/67 composition was prepared and both the epoxy constituent and the polybutadiene constituent were cured. It should be noted that the blend of Dienoxy A copolymer with the additional diglycidylether of bisphenol A (DGEBA) and the anhydride curative system formed a stable dispersion while a blend of 1,2-polybutadiene with DGEBA and the anhydride curative system rapidly separated into two phases.

33/67—1,2-POLYBUTADIENE/EPOXY RESIN COPOLYMER

The indicated quantities of Dienoxy A and DGEBA were mixed together at 95°–110° C. using a Cowles dissolver. After cooling to 75°–80° C., the required Dicumyl peroxide and anhydride curatives were mixed in again using the Cowles dissolver. Mixing time, after the addition of the curatives, was less than 15 min. Samples were cured 4 hrs. at 85° C. followed by 16.5 hrs. at 145° C. to insure cure of both constituents.

| Compounding of 33/67 - 1,2-Polybutadiene/Epoxy Resin Copolymer | |
|---|---|
| Dienoxy A (see above) | 116 parts |
| DGEBA | 100 |
| Nadic methyl anhydride | 85 |
| Benzyl dimethylamine | 2 |
| Dicumyl peroxide | 2 |

| PHYSICAL PROPERTIES OF CURED 33/67 - 1,2-POLYBUTADIENE/EPOXY COPOLYMER | |
|---|---|
| Flexural Strength × $10^{-3}$ psi | 10.98 |
| Flexural modulus × $10^{-5}$ psi | 2.84 |
| Izod, Notched ft.lbs/inch | 0.37 |
| Izod, Unnotched ft.lbs/inch | 4.2 |
| Gardner Impact in.lbs. | 3.5 |
| Hardness, Rockwell | E41 |

UREA

The stable amine terminated polymer of the present invention can be readily reacted with urea polymers having an active isocyanate end group or with urea forming monomers to generally produce copolymers of the P-U-P wherein U is the urea polymer constituent and P is the amine terminated polymer constituent. Such block copolymers generally exhibit extremely good processable properties at temperatures below the

TABLE III

| SAMPLE NO. | 1 | 2 | 3 | 4 | 5 | 6 |
|---|---|---|---|---|---|---|
| 1,2-polybutadiene (pts) | | 100 | | 100 | | 50 |
| 1,2-polybutadiene-co-styrene (pts) | | | | | 100 | 100 |
| Amine terminated 1,2-polybutadiene (pts) | | | 100 | 50 | 50 | |
| Dienoxy A (pts) | 100 | 50 | | | | |
| Silane, Dow Corning No. | Z6020* | Z6020* | Z6040* | Z6040* | Z6040* | Z6075* |
| , (pts) | 2.0 | 2.5 | 2.0 | 2.5 | 2.5 | 2.5 |
| Dicumyl peroxide | 2.0 | 3.0 | 2.0 | 3.0 | 3.0 | 3.0 |
| Flexural strength × $10^{-3}$ psi | 9.1 | 7.43 | 7.41 | 7.12 | 8.14 | 7.11 |
| Flexural modulus × $10^{-6}$ psi | 4.49 | 4.51 | 4.50 | 4.27 | 4.39 | 4.18 |
| Gardner Impact, in.lb. | 3.5 | 2.1 | 2.5 | 2.3 | 2.9 | 2.5 |
| Hardness, Rockwell E | 104 | 104 | 103 | 100 | 100 | 98 |

*Z6020 - N-(2-aminoethyl)-3-aminopropyltrimethoxysilane
*Z6040 - 3-glycidylpropyltrimethoxysilane
*Z6075 - vinyltriacetoxysilane melting temperature of the urea constituent polymer and often times at ambient temperatures.

The reaction between the amine end group of the amine terminated polymer and the isocyanate group of either the urea forming monomers or the urea polymer having a free isocyanate end group thereon, generally occurs spontaneously and at room temperature. The rate of forming the chemical bond between the two constituents of the block can, of course, be readily increased by heating to any suitable temperature such as to approximately 150° C. Various urea block copolymers can be tailor-made simply by controlling the amount of the urea-forming monomers or the urea polymer added to the amine terminated polymer. Generally, suitable polymers are produced wherein the urea block copolymer contains from about 5 percent to about 95 percent by weight of urea based upon the total weight of the block copolymer and preferably from about 25 percent to about 75 percent by weight. In such block copolymers, the favorable properties of polyurea such as high modulus are usually retained. Such block copolymers may contain various additives, colorants, fillers, antioxidants, etc., and the like, as well known to those skilled in the art. For example, the urea block copolymers may be filled with carbon black, silica, etc. The reaction is desirably carried out in any suitable solvent such as toluene, hexane, tetrahydrofuran, and the like.

The urea constituent of the block copolymer is prepared by reacting a polyisocyanate with a diamine or water. Generally, the diamines are preferred since reaction with water proceeds at a slower rate and requires the use of a catalyst. The polyisocyanate or the polyisothiocyanate has the same formula as set forth above with regard to the formation of the amine terminated polymer and, preferably, in order to avoid crosslinking and the formation of a gel, is a diisocyanate or a diisothiocyanate. Of the various aliphatic types of diisocyanates, the alkyl, cycloalkyl, and aromatic-alkyl are preferred. Suitable diamines are represented by the formula $H_2N-R-NH_2$ where R is an aliphatic, preferably an alkyl containing from 2 to about 20 carbon atoms, a cycloaliphatic, preferably a cycloalkyl containing from 4 to about 20 carbon atoms, or an aromatic containing from 6 to about 20 carbon atoms, or combinations thereof. Examples of specific diamines include ethylenediamine, tetramethylenediamine, pentamethylenediamine, ortho-phenylenediamine, paraphenylenediamine, 2,6-toluenediamine, 4,5-diethyl-ortho-phenyldiamine, the meta-xylylenediamine. Preferred diamines include hexamethylenediamine, meta-phenylenediamine, 2,4-toluenediamine, methylene-bis(ortho-chloroaniline), i.e., MOCA and methylene dianiline.

The amount of diamine utilized with regard to the polyisocyanate or diisocyanate generally varies on an equivalent basis from about 0.8 to about 1.2, with a preferred range being from about 0.95 to about 1.05. These ranges include any available polymeric amines and polyamines remaining from the amine terminated polymer synthesis. Should the equivalent ratio be below the general range or above it, usually some P-U type urea block copolymers will be formed along with free polyurea, especially if the equivalent ratio is greatly above or below. Of course, the amount of diisocyanate utilized along with the diamine or water can vary so that upon a stoichiometric basis as well as a kinetic basis the molecular weight of the polyurea constituent may generally range from about 1,000 to about 40,000 with the preferred range being from about 5,000 to about 25,000. Since diisocyanate compounds are very reactive, generally the urea polymers formed are formed in situ. In any event, it is important that the formation of the block copolymers be carried out in an environment substantially free from active hydrogens such as alcohols, acids, and the like; and thus an inert atmosphere may be used such as nitrogen, helium, argon, and the like. Of course, since water is generally an active hydrogen compound, it is thus an exception of the foregoing when it is utilized in the formation of the polyurea polymer. Should diamines be utilized as well as water, the diamines are added first in an inert atmosphere followed by the addition of water.

The temperature range of the polyurea polymerization is generally from 0° C. to about 260° C. and preferably from about 70° C. to about 180° C. The reaction when diisocyanates (or polyisocyanates) and diamines are utilized is rapid and does not require a catalyst. However, since the urea block copolymer formed is a heterogeneous mixture, the viscosity of the solution will influence the reaction rate such that a catalyst may be desired. Due often to the increase of the viscosity of the system upon polymerization, the urea block copolymer generally exists in a suspension. The urea block copolymer, however, may be readily coagulated and precipitated by a compound which is not a solvent for the amine terminated portion of the block copolymer, such as methanol.

When water is utilized in the formation of the polyurea constituent, catalysts are often desirable and are well known to those skilled in the art. Generally, such catalysts are the same as used in the formation of urethane polymers set forth below and include tertiary amines. They are used in proportion to their base strength, except when steric hindrance interferes, and a suitable amount is usually from about 0.01 to about 1.0 parts per 100 parts of urea-forming monomers. A preferred catalyst is triethylenediamine (1,4-diazo[2.2.2-]bicyclooctane), which is more powerful than would be predicted from its base strength due probably to its reduced steric hindrance. Another class of catalysts are the metallic compounds which generally are powerful enough as the catalyst to promote a "one-shot" process. Of the various members of this class, the organotins are favored. Specific examples of suitable organotins include tetra-n-butyltin acetate, n-butyltin trichloride, trimethyltin hydroxide, dimethyltin dichloride, and tributyltin acetate. A preferred organotin is dibutyltin dilaurate.

The polymeric amine constituent of the urea block copolymer may be made from any of the monomers set forth above. However, preferred monomers include the dienes containing from 8 to 12 carbon atoms and preferably from 4 to 8 carbon atoms, vinyl substituted aromatics containing from 8 to 20 carbon atoms, and copolymers made therefrom. Preferred monomers of these groups include butadiene, isoprene, vinyltoluene, styrene, and 4-5-butylstyrene, and a copolymer made from butadiene and styrene, that is, SBR of styrene-butadiene rubber. Thus, when the amine terminated polymer constituent is 1,4-polybutadiene, polyisoprene, or the like, the urea block copolymer may be used as tire rubber or as an adhesive for bonding rubber to urethanes. Additionally, such block copolymers can be reinforced with carbon black, silica, and the like. When the amine terminated polymer constituent is 1,2-polybutadiene, the copolymer, upon cure, yields a hard plastic; however, when the amine terminated polymer constituent is a thermoplastic such as polystyrene, the resulting urea block copolymer acts as a thermoplastic. When the amine terminated polymer constituent is rubber, the block copolymers may be cured in any conventional manner utilizing conventional cure systems of the amine terminated constituent and generally have properties similar to a reinforced or filled amine terminated polymer. Typical uses of the urea block copolymers are numerous and the same as those generally for polyureas or filled amine terminated polymers. Additionally, when the amine terminated polymer constituent is rubber, specific uses include tires, belting, hose and molded goods. Regardless of the nature of the base polymer constituent, the block copolymers, as noted, also have remarkably improved processability below the melt temperature of the urea constituent.

The invention will be more fully understood by reference to the following examples.

EXAMPLE XVII

A 500 ml resin kettle was fitted with a paddle stirrer, a nitrogen inlet, a septum, and a condenser, topped by a pressure relief bubbler. To 100 g of toluene was added a 60 g portion of 1,2-PBdNH$_2$ (Example V). The toluene was stirred to dissolve the resin. A 0.5 g portion of aluminum stearate (anhydrous) was added and stirred to dissolve. Then, 69.3 ml (84.7 g; 0.487 mole) of Hylene TM (80/20 2,4/2,6-toluenediisocyanate) was added through the septum via a syringe. A 0.1 ml portion of dibutyltin dilaurate was added as a catalyst for urea formation. Urea formation occurred rapidly upon the addition of 50.0 ml (55.0 g; 0.509 mole) of molten (100° C.) m-phenylene diamine. Stirring was continued for 5–10 seconds when the entire mixture solidified. Reaction in the solid phase was permitted to continue for 72 hrs. at ambient temperatures. The material was dried in vacuum to give 205.0 g of crumbly, tannish powder which darkened upon exposure to air (oxidation of excess amine). The material was sheeted out on a two-roll mill. The resulting polymer was pliable and had a glossy surface. A portion of the milled polymer was compounded on the mill according to the formulation given below. Even with 150 phr of silica, the copolymer remained pliable (like tough leather) and smooth surfaced.

The samples were cured 20 min. at 350° F. The physical properties are given below.

| COMPOUND RECIPE | |
|---|---|
| 50.0 g 30/70 - 1,2-PBdNH$_2$/TDI-MPDA | (100 pt.) |
| 75.0 g 325 mesh silica | (150 pt.) |
| 1.0 g Dicup R | (2.0 pt.) |
| 0.75 ml Z6075 Silane | (1.5 pt.) |

| PHYSICAL PROPERTIES OF CURED COMPOUND | |
|---|---|
| Flexural strength $\times 10^{-3}$ psi | 8.92 |
| Flexural modulus $\times 10^{-5}$ psi | 23.4 |
| Izod, notched, ft.lb./inch | 0.27 |
| Gardner Impact, in.lb. | 0.63 |
| Hardness, Rockwell | E80 |

URETHANE

The amine terminated polymers are readily and easily reacted with urethane polymers, urethane prepolymers, or urethane forming monomers to form urethane block copolymers. Thus, the stable amine terminated polymer described above may be stored until required and then reacted at ambient temperatures or at temperatures from about 20° C. to about 150° C. with urethane-forming monomers or the prepolymer to produce an in situ polymerization of the urethane polymer constituent. Alternatively and less desirably, the urethane-forming monomers or prepolymers may be polymerized, and then reacted with the amine terminated polymer within the same temperature range. Generally, the urethane block copolymer is of the P-U-P type where P represents the amine terminated polymer and U represents the urethane polymer constituent. Additionally, urea-forming monomers may be utilized in association with the urethane polymers or urethane-forming monomers and prepolymers to produce urethane-urea copolymers or block copolymers also of the P-U-P type structure. The urethane block copolymer, as well as the urethane-urea block copolymer, generally exhibits good or improved processability at temperatures below the melt temperature of the urethane constituent or the urethane-urea constituent and may be utilized in a great number of applications as a thermoset upon cure.

The urethane polymer constituent of the block copolymer generally contains a significant number of urethane groups to impart urethane-type properties to it. Generally, the urethane constituent is prepared by reacting a polyisocyanate with any of a number of conventional polyhydroxy compounds which contain at least two hydroxy groups. Of course, the hydroxyl groups may either be end groups or located on the backbone of the compound. The polyisocyanates have the same formula as set forth above with regard to the formation of the amine terminated polymer and, thus, may be a polyisocyanate or a polyisothiocyanate, in which case, a thiourethane block copolymer is formed. As in the description of the preparation of the urea polymer constituent, diisocyanates are preferred in order to avoid gels, and the R group is preferably an alkyl group having from 2 to 20 carbon atoms, a cycloalkyl group having from 4 to 20 carbon atoms, an aromatic having from 6 to 20 carbon atoms, or combinations thereof. Preferred diisocyanates for use in the preparation of the urethane polymer constituent or the urethane-urea polymer constituent are the same as those set forth above with regard to the discussion of the urea polymer constituent or for the preparation of the amine terminated polymer.

Examples of polyhydroxy compounds which, of course, generally contain an active hydrogen include the di- and polyhydric alcohols such as the di- and polyhydric phenols, the polyether polyols such as the polyether diols, the polyester diols, the polylactone diols, the phenol-aldehyde novalacs, and castor oil. Compounds containing groups such as amino and carboxyl may be used. Thus, a typical urethane block copolymer may contain, in addition, to the urethane groups in the urethane constituent, aliphatic and aromatic hydrocarbon residues, ester, ether, amide, and urea groups.

Suitable di- and polyhydric alcohols which may be reacted with polyisocyanates include the conventional alcohols while are commonly used in the formation of urethanes and, in general, the di- and polyhydric alcohols such as the alkylene polyols having from 2 to 30 carbon atoms, the cycloalkyl polyols having from 4 to 30 carbon atoms, and the alkanol or cycloalkanol substituted aromatic compounds having from 8 to 30 carbon atoms. Specific examples include α,α'-dihydroxyxylenes, 1,3-dihydroxytetraline, and 1,4-dihydroxytetraline. Specific examples of dihydric alcohols or alkylene polyols include primary and secondary alkyl diols having from 2 to 6 carbon atoms such as ethylene glycol; 1,2-propanediol, 1,3-propanediol; 1,2-butanediol; 1,3-butanediol; 1,4-butanediol; 1,5-pentanediol; 1,6-hexanediol; 2,3-hexanediol; 2,5-hexanediol; and 3,4-hexanediol. Examples of a specific cycloalkyl alcohol or a cycloalkyl polyol include 1,4-dimethylol cyclohexane; 1,2-cyclopentanediol; 1,4-cyclohexanediol; or 2,2-bis(4-hydroxycyclohexane)propane (hydrogenated bisphenol A). Specific examples of alkylene polyols include glycerol; 1,2,6-hexanetriol; sorbitol; mannitol; pentaerythritol; and 2-ethyl-2-hydroxymethyl-1,3-propanediol.

Generally, any of the polyether polyols such as the polyether diols which are used in the formation of urethanes may be reacted with polyisocyanates to form the urethane polymer constituent of the block copolymer. Such compounds include the polyether polyols prepared from cyclic ethers having from 2 to 8 carbon atoms, preferably from 2 to 4 carbon atoms, and the polyether polyols prepared from substituted cyclic ethers having from 2 to 8 carbon atoms in the ring such as the substituted ethylene oxide ether (formula No. 5), the substituted oxirane ethers (formula No. 7) and the substituted tetrahydrofurans. The substituted "R" group of the above ether ring compounds is the same as set forth with regard to formula 5 and 7, except that the "R" group may contain up to 20 carbon atoms. That is, "R" may be an alkyl having from 1 to 20 carbon atoms, a cycloalkyl having from 4 to 20 carbon atoms, an aromatic ring (i.e., phenyl), or a substituted aromatic ring wherein said substituted group is an alkyl having from 1 to 20 carbon atoms or a cycloalkyl group having from 4 to 20 carbon atoms. Examples of polyether polyols made from cyclic ethers include compounds preferably derived from propylene oxide and/or ethylene oxide, and to a much lesser extent, those derived from styrene oxide, formula No. 5, and from the above-mentioned alkylene polyols. Additional examples include the polyether polyols made from the poly(oxypropylene) triols, the polyethers which have greater than three hydroxy groups such as those made from the polyols of mannitol and pentaerythritol, and from the substituted oxirane ring such as 3,3-dimethoxycyclobutane, 3,3-diethyloxycyclobutane, and 3,3-methylethyloxycyclobutane. A highly preferred group of specific polyether diols are the polytetramethyleneoxide glycols which, of course, are prepared by the polymerization of tetrahydrofuran.

Generally, the various polyhydroxy compounds set forth immediately above, that is, the various diols and polyols, the di- and polyhydric alcohols, the various polyether polyols such as those prepared from cyclic ethers as well as those prepared from the specifically disclosed cyclic ethers, have an equivalent weight of from about 100 to about 5,000. Preferably, the molecular weight per hydroxy group of the polyhydroxy compound will range from about 200 to about 1,000.

The polyester diols constitute yet another class of polyhydroxy compounds which may be used to form the urethane polymer constituent of the block copolymer and generally any polyester which is used in the formation of urethane polymers may be utilized. Typical monomers used to prepare polyesters for the urethane polymer constituent include adipic acid or phthalic anhydride condensed with any of the alkyl diols listed above having from 2 to 6 carbon atoms. For the preparation of branched polyesters, triols such as glycerol, 1,2,6-hexanetriol, trimethylolpropane, that is, 2-hydroxymethyl-2-methyl-1,3-propanediol, may be used; and to a lesser extent, the various polyols such as sorbitol, mannitol and pentaerythritol. As apparent to one skilled in the art, it is desirable to use polyesters which contain only hydroxyl groups as reactive sites and, hence, polyesters which have very low acid numbers and very low water content are preferred.

The polylactone diols constitute yet another class of polyhydroxy compounds which may be used to form the urethane polymer constituent of the block copolymer. The lactones used in the preparation of the polylactone diols contain at least 3 carbon atoms and generally up to 15. Examples of specific lactones include caprolactone and capryllactone. The polylactone diols made from caprolactone are preferred in the present invention.

Generally, the equivalent ratio of the polyisocyanate or polyisothiocyanate compounds which are reacted with the polyhydroxy compounds to form the urethane polymer constituent is from about 0.8 to about 1.2. A preferred equivalent ratio is from about 0.95 to about 1.05. Of course, the isocyanate will also react with the amine group of the amine terminated polymer. However, since the number of hydroxyl end groups of the polyhydroxy compounds are large in comparison to the amine groups, these ratios are still valid when based upon the amount of both the hydroxyl end groups and the amine end groups. The actual equivalent ratio may vary above these ranges or below them. Generally, the further away the equivalent ratio is from the desired equivalent ratio, the more P-U type block copolymers are formed along with free polyurethane. On the other hand, if polyisocyanate monomers such as triisocyanates are utilized, the resulting polymeric material will be a gel or a crosslinked entity due to the additional reactive sites provided by the triisocyanates. Since such entitles are difficult to process, diisocyanates are preferred. Of course, the weight percent of the urethane polymer constituent in the block copolymer will be largely controlled by the amount of the urethane-forming monomers utilized in association with the amount of the amine terminated polymers utilized. That is, the molecular weight of the urethane or the urethane-urea polymer constituent can vary considerably such as from 1,000 to about 100,000. Generally, urethane block copolymers as well as urethane-urea block copolymers having desirable processing properties, as well as cured properties have been produced wherein the weight percent of the urethane or the urethane-urea constituent is generally from 5 percent to 95 percent based upon the total weight of the block copolymer and preferably from about 25 percent to about 75 percent.

In order that the in situ polymerization of the urethane polymer or the urethane-urea copolymers, wherein diamines are utilized, do not react with compounds containing active hydrogens such as water, alcohol, acids, etc., it is generally important that such polymerization is carried out in an environment substantially free from active hydrogens as in an inert atmosphere such as nitrogen, helium, argon, and the like. However, it is to be understood that a small amount of active hydrogen compounds may be present provided that a sufficient number of urethane polymers or urethane-urea polymers may be formed from the amine group of the amine terminated polymer.

Catalysts are often used to promote the formation of the urethane polymer constituent of the block copolymer. The catalysts suitable for promoting the formation of urethane polymers are also generally suitable for promoting the formation of the urethane constituent in the present invention and such catalysts are well known to those skilled in the art. For example, tertiary amines which are conventional urethane catalysts may be used and generally their catalytic strength is in proportion to their base strength except when steric hindrance interferes. An exception is triethylenediamine (1,4-diaza[2.2.2]bicyclooctane), a preferred catalyst which is much more powerful than would be predicted from its base strength due probably to its complete lack of steric hindrance. A large number of metallic compounds constitute another class of catalysts and generally these catalysts are powerful enough to promote "one-shot" processes. Of the various members of this class, the organotins are favored. Specific examples of suitable organotins include tetra-n-butyltin acetate, n-butyltin trichloride, trimethyltin hydroxide, dimethyltin dichloride and tributyltin acetate. A preferred organotin is di-n-butyltin dilaurate.

Since the polymerization temperature of the urethane polymer constituent can range from about ambient to about 100° C. and since the reaction of the urethane polymer or urethane-forming monomers with the amine group of the amine terminated polymer occurs easily at ambient temperatures and at a faster rate at elevated temperatures, in situ polymerization of the urethane constituent is preferred. Although the reaction of the urethane can be controlled to a large extent through the selection of temperature as well as the particular polyisocyanate and the polyhydroxy compound, the choice of the catalyst can often give broader control. In fact, the catalyst effect of some catalysts are so powerful that they often override the influences of the reactants and therefore such catalysts are used to control the reaction. One group of such catalysts, as well known to those skilled in the art, are the aforementioned organotins which contain from 1 to 60 carbon atoms.

The amine terminated polymer can be made from any of the types of monomers set forth above with regard to the preparation of said polymer and can be made in the exact same manner. Often, the resulting urethane block copolymer will be readily processable at temperatures below the melt temperature of the urethane constituent (or the urethane-urea constituent) but will exhibit properties of the urethane constituent (or the urethane-urea constituent) upon cure. Desirably, the amine terminated polymer is made from conjugated dienes having from 4 to 12 carbon atoms, vinyl substituted aromatic compounds having from 8 to 20 carbon atoms, and copolymers made from combinations thereof. Desirable conjugated dienes contain from 4 to 8 carbon atoms. Specifically preferred conjugated monomers include butadiene and isoprene, whereas preferred vinyl substituted aromatic monomers include styrene, vinyltoluene, and 4-t-butylstyrene. A preferred copolymer is made from butadiene and styrene monomers, that is, SBR (styrene-butadiene rubber).

The in situ polymerization of the urethane block copolymers or the urethane-urea block copolymers can generally be carried out in bulk or in a solvent.

Generally, the choice of urethane preparation conditions (that is, in bulk or in a solvent) controls, to an extent, the processing properties of the block copolymer. When the polyurethane portion is prepared in a solvent, which is essentially a non-solvent for polyurethane (that is, non-polar solvents such as hexane, heptane, or toluene), the resulting urethane block copolymers are millable at room temperature. However, when the urethane preparation is carried out in bulk or in solvents of good dissolving power for urethane, such as DMF, DMAC, the urethane block copolymers must be processed at a temperature near or above the softening point of the urethane constituent. Nevertheless, such block copolymers are still readily processable.

Various additives, colorants, reinforcing fillers, stabilizers, and the like may be utilized as are common in the preparation of the amine terminated polymer. Thus, when utilizing a conjugated diene such as butadiene or isoprene in preparing the amine terminated polymer, conventional fillers such as carbon black, silica, oil, and the like may be utilized. Additionally, the amine terminated polymer portion of the block copolymer may be readily cured through the use of conventional curing agents. Thus, for rubber-type amine terminated polymers, conventional sulfur-containing compounds, organic peroxides, and the like may be utilized at convenient or conventional amounts to produce thermosets. The properties of the cured urethane block copolymers generally retain the general properties of urethane such as good abrasion resistance and flexibility. Thus, the urethane block copolymers may be used for items such as rubber goods, molded goods, and heavy-duty industrial applications where chemical, abrasion, and corrosion resistance are desired as well as for any items wherein rubber is commonly used. When the amine polymer is a copolymer such as styrene-butadiene, the resulting urethane block copolymer may generally be used wherever reinforced cured rubbers have been utilized.

EXAMPLE XVIII

A 1 liter resin kettle fitted with a mechanical stirrer, nitrogen inlet, thermometer and Dean-Stark trap topped with a condenser was charged with 30.0 g of 1,2-PBdNH$_2$ containing 0.0054 equivalents of NH$_2$ as a hexane cement (Example V) and 750 ml of toluene. The mixture was heated to reflux and remove any water by azeotropic distillation. Distillation was continued to remove the hexane. After the vapor temperature reached 107° C., the heating was stopped and the toluene cement was allowed to cool to about 60° C. Then, 65.6 g of Adiprene LD 784 prepolymer (DuPont polytetramethylene ether glycol reacted with toluene diisocyanate) with 6.32 weight percent NCO (0.0987 equivalents of NCO) was added and mixed well while heating the reaction to 85°–90° C. After 15 min. of mixing, 4.5 ml of 1,4-butanediol (0.102 equivalents of OH) were charged and the reaction was heated at reflux for 1 hr. A catalyst (0.05 ml of dibutyltin dilaurate) was then added and reflux was continued for an additional 15 hrs. After this period of reaction, there was no detectable NCO absorbance in the IR spectrum indicating complete reaction. The copolymer was recovered by coagulation in methanol and drying in vacuo at 70° C. overnight. The copolymer recovery was 93.2 g. A portion of the copolymer was mill compounded with 2.0 pph of 2,5-dimethyl-2,5-bis(t-butylperoxy) hexane and then molded and cured for 2 hrs. at 120° C. The physical properties are given below.

| Physical Properties of |   |
| 30/70 - 1,2-PBdNH$_2$/Adiprene-1,4-butenediol Copolymer | |
| --- | --- |
| Hardness, Shore A | 45.3 |
| Elongation, percent | 300 |
| Tensile at break, psi | 548 |

EXAMPLE XIX

A 1 liter resin kettle fitted as described in Example XVIII was charged with 30.0 g of 1,2-PBdNH$_2$ (Example V) containing 0.0054 equivalents of NH$_2$ as a hexane cement and 750 ml of toluene. The hexane and any water present were removed by azeotropic distillation as described in Example XVIII. After cooling the reaction to 60°-70° C. under nitrogen, 37.7 ml (46.2 g or 0.265 moles) of an 80/20 mixture of 2,4-/2,6-toluenediisocyanate was added and stirred for 30 min. before 24.7 ml (25.2 g or 0.278 moles) of 1,4-butanediol and 0.05 ml of dibutyltin dilaurate were added. The reaction mixture was heated at reflux for 6 hrs. and then allowed to cool and stir under nitrogen for 16 hrs. The copolymer was precipitated in methanol, collected by suction filtration and dried in vacuo at 50° C. Copolymer recovery was 79.2 g. A portion of the copolymer was compounded on a two roll mill, cured and tested as indicated below.

| 30/70 - 1,2-PBdNH$_2$/Toluene Diisocyanate-1,4-Butanediol Copolymer | |
| --- | --- |
| Compounding | |
| 1,2-PBdNH$_2$/TDI-1,4-Bu(OH)$_2$ | 100 pts. |
| 325 Mesh Silica | 150 pts. |
| Dicup R | 2.0 pts. |
| Silane Z6075* | 1.5 pts. |
| Cured 16 hrs. at 135° C. | |
| Physical Properties | |
| Flexural Strength × 10$^{-3}$ psi | 4.78 |
| Flexural Modulus × 10$^{-5}$ psi | 7.48 |
| Izod, Notched ft.lb./in. | 0.223 |
| Hardness, Rockwell | M 78.5 |

*Triacetoxy vinyl silane

As previously noted, in lieu of a purely urethane polymer constituent, a urethane-urea copolymer may be utilized. Otherwise, the preparation as well as the other aspects of the formation of the urethane block copolymer such as catalysts, polymerization method, and the like, are the same. Usually, in order to form the urethane-urea type block copolymers, in addition to the use of polyisocyanates and polyhydroxy compounds, diamines are used. Suitable diamine monomers have the formula H$_2$N—R—NH$_2$ wherein R is the same as set forth above with regard to the discussion of the urea block copolymer. Similarly, specific examples of diamines as well as preferred diamines are the same. Generally, the urethane-urea block copolymer will have uses very similar to either the urea block copolymer or the urethane block copolymer depending upon the number of urea or urethane groups within the copolymer. In any event, the equivalent ratio of the polyhydroxy compounds plus the diamine compounds to the polyisocyanate compounds generally ranges from about 0.8 to about 1.2 with a preferred range being from about 0.95 to about 1.05. As with the urea block copolymers or the urethane block copolymers, the urethane-urea block copolymers may contain additives, conventional fillers, reinforcing fibers, stabilizers, colorants, and the like, and may be cured with conventional curing agents.

EXAMPLE XX

To a 1 liter, 3 necked flask fitted with a mechanical stirrer, nitrogen inlet, thermometer and a distillation head, the indicated quantities of amine terminated 1,2-polybutadiene (1,2-PBdNH$_2$, Example V) of 24,600 viscosity average molecular weight were charged as hexane cement. The indicated quantities of hydrocarbon solvent were added and the mixture heated to distill off the hexane and any water. When the vapor temperature had reached 95° C. in the heptane example, or 107° C. in the toluene example, the mixture was cooled under nitrogen to below the boiling point of the solvent and the distillation head was replaced by a reflux condenser. The indicated quantities of an isocyanate terminated polycaprolactone diol prepolymer were added to the flask and dispersed by stirring. The required quantity of a solution of 2,4-toluenediamine in dioxane was added to each reaction mixture and after addition of tin catalyst, the entire mixture was heated at reflux to generate the urethane-urea block polybutadiene copolymer. The product was recovered by precipitation in alcohol followed by suction filtration and drying in vacuo overnight. Samples of each preparation were compounded as indicated below on a two-roll mill. Test pieces were molded and cured 20 mins. at 350° F. The physical properties are listed below.

| Preparation of 30/70 - 1,2-PBdNH$_2$/Urethane-Urea Copolymers | | |
| --- | --- | --- |
|  | A | B |
| 1,2-PBdNH$_2$ | | |
| (50.6 percent solids in hexane) | 60.8 g | 60.5 g |
| Heptane | 500 ml | — ml |
| Toluene | — ml | 500 ml |
| NIAX D520 Prepolymer* | | |
| (6.91 wt. percent NCO) | 65 g | 65 g |
| 2,4-toluenediamine in dioxane | | |
| (0.2256 g) | 29.6 ml | 29.6 ml |
| Dibutyltin dilaurate | 0.1 ml | 0.1 ml |
| Reflux time | 10 hrs. | 24 hrs. |
| Reflux temperature | 95 ° C. | 107 ° C. |

*Union Carbide polycaprolactone diol reacted with toluene diisocyanate

| Compounding of 30/70 - 1,2-PBdNH$_2$/Urethane-Urea Copolymers | | | |
| --- | --- | --- | --- |
|  | A | B | |
| 30/70 - 1,2-PBdNH$_2$/urethane-urea | 100 | 100 | parts |
| Silica, 325 mesh | 150 | 150 | parts |
| Dicup R | 2.0 | 2.0 | parts |
| Silane, Z6075 | 1.5 | 1.5 | parts |

| PHYSICAL PROPERTIES OF CURED, COMPOUNDED 1,2-PBdNH$_2$/URETHANE-UREA COPOLYMERS | | |
| --- | --- | --- |
|  | A | B |
| Flexural strength × 10$^{-3}$ psi | 2.89 | 4.36 |
| Flexural modulus × 10$^{-5}$ psi | 5.13 | 4.45 |
| Izod, notched, ft.lbs/in. | 0.44 | 0.47 |
| Izod, unnotched, ft.lbs/in. | 1.4 | 1.9 |
| Gardner Impact, in.lb. | 3.1 | 2.7 |
| Heat Distortion temperature | 230 | 230 |
| ° C. at 264 psi loading | (0.004 inch deflection) | (0.003 inch deflection) |
| Hardness, Rockwell | M24 | E3 |

EXAMPLE XXI

To a 1 liter, three-necked flask fitted with a thermometer mechanical stirrer and vacuum take-off was charged 200 g of a 20 percent hexane cement of amine terminated 1,2-polybutadiene (1,2-PBdNH₂). The hexane was stripped under vacuum to remove traces of water, then the 1,2-PBdNH₂ was redissolved in 300 ml of dry hexane. To this polymer cement was added 200 g of Adiprene L-167 (6.5 percent NCO) (DuPont polytetramethylene ether glycol diisocyanate terminated polymer) which was dispersed by vigorous stirring while the hexane was removed under heat and vacuum. The polymer-prepolymer mixture was maintained at 70° C. while 0.75 g of 2,5-dimethyl-2,5-bis-(t-butylperoxy)hexane charged at 1.875 pph 1,2-PBdNH₂) was dispersed in the mixture. Then 42.9 g of molten MOCA (methylenebis-4[2-chloroaniline]) was added to the mixture with rapid stirring. The reaction was permitted to stir vigorously under vacuum for 1 min. and then the mixture was poured into molds and cured for 2 hrs. at 120° C. The physical properties obtained are given below.

| Physical Propertes of 14/86 - 1,2-PBdNH₂/Urethane-Urea | | |
|---|---|---|
| Measured at | 73° F. | 212° F. |
| Shore A | 93 | — |
| Elongation at break | 505 | 436 percent |
| Modulus at % Elongation | | |
| 5 | 292 | — psi |
| 100 | 1,150 | 727 psi |
| 300 | 1,725 | 867 psi |
| Break | 3,075 | 1,063 psi |

IMIDE

The stable amine terminated polymer can be reacted with imide-forming monomers in situ to produce an imide block copolymer generally of the formula P-I-P where P represents the amine terminated polymer and I represents the imide polymer constituent. The resultant imide block copolymers generally exhibit very similar or identical properties to that of conventional imide polymers but also possess greatly improved processability properties in that they are readily millable and moldable at temperatures well below the melting point of conventional imide polymers, and often times even at ambient temperatures. Due to the ease of preparation, an in situ formation is highly desired.

The imide polymer constituent of the block copolymer is produced by the chemical reaction of an alkyl dianhydride, preferably an aromatic dianhydride, or combinations thereof, with an alkyl diamine, a cycloalkyl diamine, or preferably an aromatic diamine. When the formation is in situ with the amine terminated polymer, the anhydride will readily react with the amine group of the amine terminated polymer. The alkyl dianhydrides generally contain from 8 to about 30 carbon atoms with the aromatic dianhydrides containing from 10 to about 40 carbon atoms. Naturally, the aromatic dianhydrides may contain substituted alkyl groups such as those connecting aromatic nuclei, or existing as on alkyl side chains, or combinations thereof wherein the total number of carbon atoms in the compound is from 11 to 40 carbon atoms. The alkyl diamines contain from 2 to 20 carbon atoms, the cycloalkyl diamines contain from 4 to 20 carbon atoms, and the aromatic diamines contain from 6 to about 20 carbon atoms. Similarly, the aromatic diamines may contain alkyl groups which connect the aromatic nuclei, exist as alkyl side chains, or combinations thereof, wherein the total number of carbon atoms of the substituted aromatic diamine is from 7 to 20 carbon atoms. Examples of aromatic dianhydrides include pyromellitic dianhydride, 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl) propane dianhydride; 2,2'-bis(3,4-dicarboxyphenyl) sulfone dianhydride; 3,4,9,10-perylene tetracarboxylic acid dianhydride; bis(3,4-dicarboxyphenyl) ether dianhydride; 3,3',4,4'-benzophenone tetracarboxylic dianhydride; ethyleneglycol bistrimellitate dianhydride and a dianhydride having the following formula

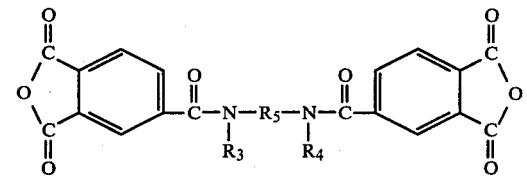

wherein $R_3$ and $R_4$ can be hydrogen, an alkyl having from 1 to about 12 carbon atoms, and an aromatic or an alkyl substituted aromatic having from 6 to 20 carbon atoms. Preferably, $R_3$ and $R_4$ are identical. $R_5$ is an alkyl having from 2 to about 12 carbon atoms or a cycloalkyl having from 4 to 15 carbon atoms. Preferably, $R_5$ is an aromatic or alkyl substituted aromatic containing from 6 to 20 carbon atoms or an aromatic having the formula:

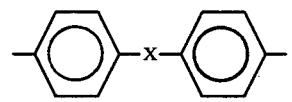

where X=O, SO₂, S, an alkyl having from 1 to 6 carbon atoms,

and SO. Highly preferred dianhydrides include pyromellitic dianhydride and benzophenone tetracarboxylic dianhydride.

Examples of preferred diamines include alkylenediamines having from 2 through 8 carbon atoms such as hexamethylenediamine; m-phenylenediamine; p-phenylenediamine; toluenediamine; and diamines having the formula:

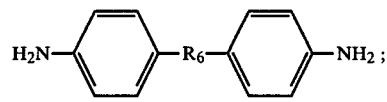

where $R_6$ is one of the divalent radicals selected from the group consisting of $C_1$ through $C_3$ alkylene;

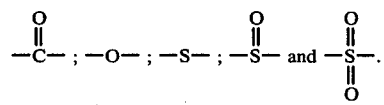

Preferred diamines include bis(4-aminophenyl)ether, bis(4-aminophenyl)sulfide, meta-phenylenediamine, methylene dianiline, and para-phenylenediamine.

The amount of dianhydride and diamines utilized can vary depending upon the generally desired molecular weight of the imide polymer constituent although as understood by those skilled in the art, the molecular weight will also be dependent upon the reaction temperature as well as various kinetic ramifications. Desirably, the equivalent ratio of the diamine to the dianhydride ranges from about 1.10 to about 0.80 with a preferred equivalent ratio being 1.05 to about 0.90. Should only small amounts of the imide-forming monomers be added, some of the amine terminated polymers will not form a block copolymer in that there is not a sufficient amount of the monomers present. Desirably, an amount of the imide-forming monomers is added so that at least 5 percent and preferably at least 25 percent of the amine terminated polymers are reacted to form imide block copolymers. The reaction of the amine group of the amine terminated polymer with a dianhydride occurs quite readily and, generally the efficiency or the reaction with the dianhydrides is very high and often can, for example, be 100 percent. The weight of the imide polymer constituent may generally vary from about 10 percent to about 75 percent by weight with 25 percent to 75 percent being preferred and 50 percent to about 75 percent being highly preferred, based upon the total weight of the block copolymer. Additionally, an amount of imide-forming monomers is generally used so that a desirable molecular weight of the imide constituent is usually between 5,000 and 35,000 and preferably between 10,000 and 35,000. Of course, higher or lower molecular weights may often be desirable.

As before with the other various block copolymers, it is desirable that the in situ reaction as well as any reaction of an amine terminated polymer with an imide polymer containing an unreacted anhydride group thereon, be carried out in an environment substantially free from active hydrogens such as water, alcohol, acids, or the like. Therefore, inert gases or atmospheres such as nitrogen, argon, or helium may be utilized. It is to be understood that a very small amount of active hydrogen may be present provided that a sufficient number of amine terminated polymers are reacted to produce the imide block copolymer having desirable properties. In the preparation of the imide block copolymer, the amine monomer is usually added to the amine terminated polymer. Then, the dianhydride monomer is generally added in an amount which is slightly in excess of that of the diamine. Reaction with both the amine group of the amine terminated polymer and the polymerization of the imide-forming monomers readily occurs at room temperature although heat may be applied to increase the reaction rate. Generally, both reactions occur in a temperature range of from about 0° C. to about 200° C. Hence, catalysts are usually not required.

As previously noted, the amine terminated polymer may be prepared in a solvent. An imide solvent such as dimethyl formamide, dimethyl acetamide or dimethyl sulfoxide is added to the reaction vessel before any in situ polymerization occurs and the solvent of the amine terminated polymer removed by distillation. Then, the diamine is added followed by a preferred excess of dianhydride with a fairly rapid exothermic reaction occurring. Since the formation of the imide polymer constituent is extremely moisture sensitive, it is very important that substantially all traces of moisture such as that contained in any of the solvents be removed from the reaction vessel so that polymerization is not retarded. The formation of the imide polymer constituent involves a ring-closing reaction whereby water is the by-product. Since it is difficult to distill the water from the imide constituent in the reaction vessel, desirably, an azeotropic forming solvent such as toluene or benzene is added to the reaction vessel. The by-product water is then removed by heating the vessel and condensing the water and aromatic solvent vapors. A Dean-Stark type trap may be utilized to separate the condensed vapors. Since the water is heavier than the aromatic solvent, it will accumulate in the bottom of the trap with the solvent overflowing from the upper portion back into the reaction vessel. Naturally, the reflux temperature of the vessel is determined by the type of azeotropic solvent utilized. The reaction is continued generally until completion, with the block copolymer formed existing in a nonaqueous suspension which can be readily separated as by drum drying or by precipitation with any non-solvent with respect to the amine terminated portion of the block copolymer.

The imide block copolymer may be cured in any conventional manner with the exception of a block copolymer wherein the polymer of the amine terminated portion tends to degrade upon curing such as the polymers made from the various vinyl aromatic monomers. Thus, conventional sulfur compounds, organic peroxide compounds, and the like may be utilized. It has been found that improved physical properties of cured imide block copolymers may be obtained, especially when the polymer of the amine terminated polymer portion has a high vinyl content, when a particular class of organic peroxides having the formula $CH_3(R)_2-OC(R)_2CH_3$ is used wherein R represents an alkyl having from 1 to 20 carbon atoms, a cycloalkyl having from 4 to 20 carbon atoms, an aromatic, or combinations thereof, containing from 6 to 20 carbon atoms. Examples of typical R groups include methyl, ethyl, propyl, butyl, pentyl, hexyl, heptyl, decyl, dodecyl, octadecyl, phenyl, tolyl, xylyl, benzyl, phenethyl, naphthyl, methylnaphthyl, naphthylethyl, diphenyl, benzylphenyl, butylphenyl, cyclohexyl, cycloheptyl, cyclohexylmethyl, cycloheptylethyl, methylcycloheptyl, and the like.

The organic peroxides of the above formula may be diperoxides or mixed peroxides, that is, peroxides which have two different $CH_3C(R)_2O$. radicals. Specific examples include dicumyl peroxide, a preferred peroxide, ditertiarybutyl peroxide, tertiarybutyl-cumyl peroxide, di-tertiaryamyl peroxide, tertiarybutyl-tertiaryamyl peroxide, tertiaryamyl-cumyl peroxide, ditertiaryoctyl peroxide, bis(1,1-diphenyl-ethyl) peroxide, bis(1,1-dicyclohexyl-ethyl) peroxide, bis(1-cyclohexyl-1-methyl-ethyl) peroxide, also known as bis(2-cyclohexyl-2-propyl) peroxide, bis(1-phenyl-1-ethyl-ethyl) peroxide, also known as bis[2-(2-phenylbutyl) peroxide], and the like. The symmetrical peroxides which have identical groups on each side of the peroxy oxygens are generally more available and therefore are preferred. However, mixed peroxides, when available, can be used very satisfactorily.

Whether mixed peroxides or diperoxides of the above class are used to impart to the block copolymers improved properties which are generally more favorable than if ordinary peroxides other than the above class were used, the peroxides used are advantageously those having a reasonably fast rate of decomposition at the temperature employed.

The various imide block copolymers possess properties generally exhibited by conventional imide polymers in that they are usually very strong and very light. Due to the preparation, they are generally void free. Furthermore, the molecular weight reduction, due to cleavage or degradation upon heating to 600° C., is usually much lower for the imide block copolymers of the present invention when compared to the weight reduction of conventional imide polymers. Another advantage is that the imide block copolymers can be processed by cold milling and molding at low temperatures such as about 150° C. when compared to temperatures of approximately 600° C. required by conventional imide polymers. Yet another advantage is that the imide block copolymers possess a greater plasticity that is more processable than comparable block copolymers made from a rubber isocyanate terminated-base polymer process. The high plasticity allows many of the imide block copolymers to be compounded with silica, for example, 100 parts of silica per 100 parts of rubber amine terminated polyimide copolymer (which gave improved flexural and impact properties when compared to the unfilled samples).

The imide block copolymers of the present invention can be utilized in applications wherever conventional imide polymers are utilized such as valve seals, retaining rings, compressor vanes, piston and bearing retaining rings, electrical relay activators, hose and tubing, and various electrical equipment where a high temperature is required such as wire and cable wraps, coil wrap, and the like. Moreover, due to their ease of processability, the imide block copolymers can also be utilized as solids such as in molds and as coatings.

Although the polymer of the amine terminated polymer constituent may be made from any of the monomers set forth above, generally, rubber-type polymers are preferred. That is, preferred monomers include the conjugated dienes having from 4 to 12 carbon atoms and preferably from 4 to 8 carbon atoms may be utilized. Additionally, vinyl substituted aromatic monomers having from 8 to 20 carbon atoms are desired. Copolymers of these two types of monomers are also desired. Highly preferred monomers include butadiene, isoprene, vinyltoluene, styrene, 4-t-butylstyrene and a copolymer of butadiene and styrene, that is SBR (styrene-butadiene rubber). As with the other block copolymers, whenever a high vinyl rubber polymer is utilized such as 1,2-polybutadiene, the resulting block copolymer will not be as flexible nor have the impact strength as a low vinyl polymer such as 1,4-polybutadiene.

The invention will be better understood by the following examples.

EXAMPLE XXII

To a clean, dry, nitrogen-purged beverage bottle was added 50 ml of dry tetrahydrofuran (THF), 72.0 g of butadiene and after cooling to −25° C. in a $CCl_4$ dry ice bath, 4.70 ml of 1.57 M n-butyl lithium (7.2 m mol) in hexane. After 4 hrs., a sample was taken and was shown by NMR to be 90 percent 1,2-polybutadiene with a 17,000 molecular weight by GPC. To this solution was added 14.0 ml of 1.034 M TDI (14.5 m mol) in toluene. Sampling after 5 min. showed 25 percent coupling by GPC. Immediately after sampling, 5 ml of molten dry caprolactam (44.2 m mol) was then added, followed by 1.0 ml of distilled water (55.5 m mol). A portion of this mixture was coagulated in methanol, dried and was titrated to give 0.118 milliequivalents of amine per gram.

The reaction mixture was transferred to a 2 liter resin kettle containing 500 ml of dry dimethyl acetamide (DMAC). After the THF was removed by distillation, 200 ml of dry toluene and 16.71 g (0.155 moles) of m-phenylene diene was added. To this solution at 100° C. was added 49.77 g (0.155 moles) of benzophenone tetracarboxylic acid dianhydride (BTDA). A Dean-Stark trap was installed and the temperature was raised such that smooth boiling occurred (130°–135° C.). Overnight, a total of 12.9 cc of toluene insolubles were collected in the trap. Analysis by gas chromatography shows this to be mainly water with some DMAC present. The clear solution during this time became a fine nonaqueous suspension in the DMAC/toluene mixture. Coagulation in excess methanol followed by methanol washing, filtering, and vacuum drying, gave 115 g of copolymer. Milling on a cold mill was used to introduce the fillers and curatives. Samples were cured for 20 mins. at 177° C.

Additional copolymers with variations in polybutadiene vinyl content, molecular weight and content were prepared by the general procedure of Example XXII. The pertinent data on copolymer composition, compounding, and physical properties is tabulated below.

TABLE IV

|  | 1 | 2 | 3 | 4 | 5 | 6 | 7 | 8 |
|---|---|---|---|---|---|---|---|---|
| Percent imide | 50 | 60 | 70 | 50 | 50 | 50 | — | — |
| Polybutadiene molecular weight × $10^{-3}$ | 17.0 | 20.0 | 23.6 | 11.2 | 11.6 | 24.8 | — | — |
| $NH_2$ meq/gm | .118 | .068 | .06 | .09 | .17 | .08 | — | — |
| Percent vinyl | 90 | 92 | 83 | 83 | 75 | 77 | — | — |
| Plasticity, $cm^2$* | 15.3 | 15.6 | 7.8 | 12.6 | 25.4 | 16.0 | — | — |
| Dicumylperoxide parts | 2 | 2 | 4 | 4 | 6 | 6 | 2 | 2 |
| Silica parts | — | — | — | 100 | 100 | 100 | 100 | 100 |
| Flex Modulus GPa | 2.36 | 1.50 | 3.56 | 3.44 | 5.34 | 5.25 | 5.71 | 5.81 |
| Flex Strength MPa | 40.3 | 17.9 | 44.1 | 49.7 | 52.7 | 60.1 | 75.9 | 56.8 |
| Notched Izod J/m | 10.7 | 11.2 | — | 16.5 | 13.9 | 9.1 | 16.0 | 14.9 |
| Gardner Impact Strength mJ | 176 | 141 | 141 | 299 | 188 | 184 | 226 | 219 |
| Heat Distortion Temperature at 1.84 MPa (° C.) | 122 | 100 | 180.5 | 140 | — | 195 | >250 | 238 |
| Hardness Rockwell E | 52 | 42 | 92 | 47 | 79 | 83 | 80 | 80 |
| TGA at 10° C./min. | | | | | | | | |
| $T_{onset}$ (° C.) in $N_2$ | 412 | 410 | 433 | 438 | 438 | 424 | — | — |
| in air | 395 | 414 | 438 | 440 | 447 | 443 | — | — |
| Percent loss at 579° C. in $N_2$ | 30.5 | 26.6 | 31.6 | 29.8 | 31.7 | 31.8 | — | — |
| in air | 53.6 | 45.0 | 46.0 | 51.0 | 47.6 | 50.5 | — | — |

*area of 0.5 g sample pressed at 100° C. for 30 sec. under 2,000 lbs. ram pressure in Carver 6 × 6" laboratory press While in accordance with the patent statutes, the preferred embodiments have been illustrated and described in detail, it is to be understood that the invention is not limited thereto with the scope of the invention being measured by the scope of the attached claims.

What is claimed is:

1. An imide block copolymer composition, comprising:
   an amine terminated polymer connected to an imide polymer constituent to form the imide block copolymer;
   said amine terminated polymer being an end capped polymer formed by the reaction of an anionically prepared polymer and a single polyisocyanate or polyisothiocyanate compound so that at least one unreacted isocyanate or isothiocyanate end portion has been converted to an amine group;
   said anionically prepared polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of
   1. $CH_2=CACN$ wherein A is CN, $CF_3$,, $CH_3$ or H;
   2. $CH_2=CACO_2R$ wherein A is $CO_2R$, $SO_2R$, $CH_3$ or H;
   3. $CH_2=CANO_2$ wherein A is Cl, $CH_3$ or H;
   4. $CH_2=CACON(R)_2$ wherein A is $CH_3$ or H;
   wherein R is a 1 to 15 carbon atom alkyl, a 4 to 15 carbon atom cycloalkyl, an aryl, a 1 to 15 carbon atom alkyl substituted aryl, a 4 to 15 carbon atom cycloalkyl substituted aromatic, or hydrogen;
   said copolymer made from monomers of conjugated dienes and vinyl substituted aromatics;
   said polyisocyanate and said polyisothiocyanate having the formula $$R + N=C=X)_n$$

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur;
   the molecular weight of said amine terminated polymer ranging from about 3,000 to about 100,000,
   said imide constituent being the reaction product of a diamine and a dianhydride, said diamine selected from the class consisting of an alkyl diamine having from 2 to about 20 carbon atoms, a cycloalkyl diamine having from 4 to 20 carbon atoms, an aromatic diamine having from 6 to about 20 carbon atoms, and an alkyl substituted aromatic diamine having from 7 to about 20 carbon atoms;
   said dianhydride selected from the class consisiting of an alkyl dianhydride having from 8 to 30 carbon atoms, an aromatic dianhydride having from 10 to 40 carbon atoms, and an alkyl substituted aromatic dianhydride having from 11 to 40 carbon atoms;
   the amount of said imide polymer constituent ranging from about 10 percent to about 75 percent by weight based upon the total weight of said block copolymer; and
   the molecular weight of said imide polymer constituent ranging from about 5,000 to about 35,000.

2. An imide block copolymer composition according to claim 1, wherein in said polyisocyanate formula n is 2, X is oxygen and wherein said R group is an alkyl containing from 2 to about 20 carbon atoms, a cycloalkyl containing from 4 to about 20 carbon atoms, an aromatic containing from 6 to about 20 carbon atoms, and combinations thereof;
   said diamine selected from the class consisting of alkylenediamines having from 2 through 8 carbon atoms, m-phenylenediamine, p-phenylenediamine, toluenediamine, and diamines having the formula

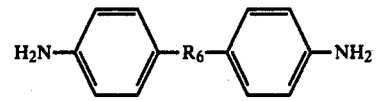

wherein $R_6$ is one of the divalent radicals selected from the class consisting of $C_1$ through $C_3$ alkylene;

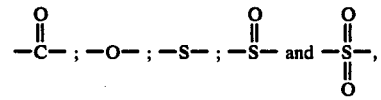

wherein said dianhydride is selected from the class consisting of pyromellitic dianhydride; 2,3,6,7-naphthalene tetracarboxylic dianhydride, 3,3',4,4'-diphenyl tetracarboxyl dianhydride; 1,2,5,6-naphthalene tetracarboxylic dianhydride; 2,2',3,3'-diphenyl tetracarboxylic dianhydride; 2,3-bis(3,4-dicarboxyphenyl) propane dianhydride; bis(3,4-dicarboxyphenyl)sulfone dianhydride; 3,4,9,10-perylene tetracarboxylic acid dianhydride; bis(3,4-dicarboxyphenyl)ether dianhydride; 3,3',4,4'-benzophenone tetracarboxylic dianhydride; ethyleneglycol bistrimellitate dianhydride and a dianhydride having the formula

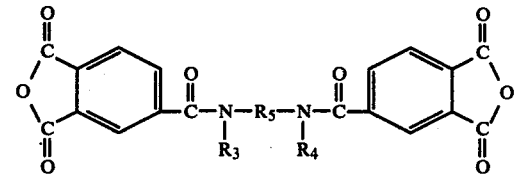

wherein $R_3$ or $R_4$ are hydrogen, an alkyl having from 1 to 12 carbon atoms, an aromatic or an alkyl substituted aromatic having from 6 to 20 carbon atoms; $R_5$ is an alkyl having from 2 to 12 carbon atoms, a cycloaliphatic having from 4 to 15 carbon atoms, an aromatic, an alkyl substituted aromatic having from 6 to 20 carbon atoms, or an aromatic compound having the formula

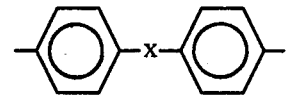

wherein X is O, $SO_2$, S, an alkyl having from 1 to 6 carbon atoms, C=O, or SO.

3. An imide block copolymer composition according to claim 2, wherein said conjugated dienes have from 4 to 12 carbon atoms, wherein said vinyl substituted aromatic compounds have from 8 to 20 carbon atoms, and wherein said copolymer is made from conjugated dienes having from 4 to 12 carbon atoms and vinyl substituted aromatics having from 8 to 20 carbon atoms.

4. An imide block copolymer composition according to claim 2, wherein said amine terminated homopolymer is made from monomers selected from the class consisting of conjugated dienes having from 4 to 8 carbon atoms, and vinyl substituted aromatics having from 8 to 20 carbon atoms; and wherein said amine terminated copolymer is made from monomers of conjugated dienes having from 4 to 8 carbon atoms and vinyl substituted aromatics having from 8 to 20 carbon atoms.

5. An imide block copolymer composition according to claim 4, wherein said homopolymer is made from monomers selected from the class consisting of butadiene, isoprene, vinyltoluene, styrene, alpha-methylstyrene, and 4-t-butylstyrene;
wherein said copolymer is a copolymer of butadiene and styrene;
wherein said dianhydride is selected from the class consisting of pyromellitic dianhydride and 3,3',4,4'-benzophenone tetracarboxylic dianhydride; and
wherein said diamines are selected from the class consisting of bis(4-aminophenyl)ether, bis(4-aminophenyl)sulfide, meta-phenylenediamine, methylene dianiline, and para-phenylenediamine.

6. An imide block copolymer composition according to claim 5, wherein said imide polymer constituent of said block copolymer ranges from about 25 percent to about 75 percent by weight.

7. An imide block copolymer composition according to claim 6, wherein said isocyanate compound is selected from the class consisting of para-phenylene diisocyanate, meta-phenylene diisocyanate, diphenyl methane diisocyanates, dianisidine diisocyanates, isophorone diisocyanates, toluene diisocyanates, bitolylene diisocyanates, hexamethylene diisocyanate and pentamethylene diisocyanate.

8. An imide block copolymer composition according to claim 4, wherein said imide block copolymer composition is cured.

9. A process for producing an imide block copolymer, comprising the steps of:
anionically polymerizing ethylenically unsaturated monomers to form a polymer, said polymer being a homopolymer or a copolymer, said homopolymer made from monomers selected from the class consisting of conjugated diene, vinyl substituted aromatic, vinyl substituted pyridine, vinyl substituted quinoline, and a compound selected from the class consisting of
1. $CH_2=CACN$ wherein A is CN, $CF_3$, $CH_3$ or H;
2. $CH_2=CACO_2R$ wherein A is $CO_2R$, $SO_2R$, $CH_3$ or H;
3. $CH_2=CANO_2$ wherein A is Cl, $CH_3$ or H;
4. $CH_2=CACON(R)_2$ wherein A is $CH_3$ or H;
wherein R is a 1 to 15 carbon atom alkyl, a 4 to 15 carbon atom cycloalkyl, an aryl, a 1 to 15 carbon atom alkyl substituted aryl, a 4 to 15 carbon atom cycloalkyl substituted aromatic, or hydrogen,
said copolymer made from monomers of conjugated dienes and vinyl substituted aromatics;
reacting said anionically prepared polymer with a compound selected from the class consisting of a polyisocyanate or a polyisothiocyanate to form an end capped polymer, said polyisocyanate or said polyisothiocyanate having the formula

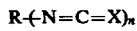

wherein R is an aliphatic containing from 2 to about 20 carbon atoms, a cycloaliphatic containing from 4 to about 20 carbon atoms, an aromatic containing from 6 to about 20 carbon atoms, and combinations thereof, n is an integer of 2 or 3 and X is selected from the class consisting of oxygen and sulfur;
reacting an amide compound with said end capped polymer to form an imide-type terminated polymer;
hydrolyzing said imide terminated polymer to produce a primary amine terminated polymer, the molecular weight of said amine terminated polymer ranging from about 3,000 to about 100,000;
reacting said amine terminated polymer with imide-forming monomers; and
polymerizing said imide-forming monomers to produce an imide polymer;
said imide polymer connected to said amine terminated polymer and forming the imide block copolymer;
said imide polymer being the reaction product of a diamine and a dianhydride, said diamine selected from the class consisting of an alkyl diamine having from 2 to about 20 carbon atoms, a cycloalkyl diamine having from 4 to about 20 carbon atoms, an aromatic diamine having from 6 to about 20 carbon atoms, and carbon atoms;
said dianhydride selected from the class consisting of an alkyl dianhydride having from 8 to 30 carbon atoms, an aromatic dianhydride having from 10 to 40 carbon atoms, and an alkyl substituted aromatic dianhydride having from 11 to 40 carbon atoms;
the amount of said imide polymer constituent of said block copolymer ranging from about 10 percent to about 75 percent by weight based upon the total weight of said block copolymer; and
the molecular weight of said imide polymer constituent ranging from about 5,000 to about 30,000 by weight.

10. A process according to claim 9, wherein said amide is selected from the class consisting of amides of ammonia, amides of primary amines, lactams, sulfonic acid amides, and sultams;
utilizing an equivalent amount of said amide compound to said end capped polyisocyanate polymers ranging from about 1 to about 20;
utilizing an equivalent amount of said water to said amide compounds ranging from about 1.0 to about 10;
said polyisocyanate having an n value of 2, wherein X is oxygen and wherein said R group is an alkyl containing from 2 to about 20 carbon atoms, a cycloalkyl containing from 4 to about 20 carbon atoms, an aromatic containing from 6 to about 20 carbon atoms, and combinations thereof; and
said imide polymer made by reacting imide forming monomers of a diamine with a dianhydride, the equivalent ratio of said diamines to said dianhydrides ranging from about 1.10 to about 0.80.

11. A process according to claim 10, wherein said amide has the formula

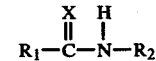

wherein $R_1$ and $R_2$ are selected from the class consisting of an aliphatic having from 1 to 20 carbon atoms, a cycloaliphatic having from 4 to 20 carbon atoms, an aromatic having from 6 to 20 carbon atoms, combinations thereof, and hydrogen, and where X is oxygen or sulfur;

wherein said amide is a lactam having from 3 to 16 carbon atoms;

said diamine compound is selected from the class consisting of alkyl diamines having from 2 through 8 carbon atoms, m-phenylenediamine, p-phenylenediamine, toluenediamine, and diamines having the formula

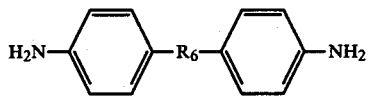

wherein $R_6$ is one of the divalent radicals selected from the class consisting of $C_1$ through $C_3$ alkylene;

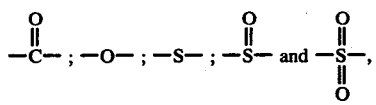

and wherein dianhydride is selected from the class consisting of pyromellitic dianhydride; 2,3,6,7-naphthalene tetracarboxylic dianhydride; 3,3',4,4'-diphenyl tetracarboxyl dianhydride; 1,2,5,6-naphthalene tetracarboxylic dianhydride; 2,2',3,3'-diphenyl tetracarboxylic dianhydride; 2,3-bis(3,4-dicarboxyphenyl)propane dianhydride; bis(3,4-dicarboxyphenyl)sulfone dianhydride; 3,4,9,10-perylene tetracarboxylic acid dianhydride; bis(3,4-dicarboxyphenyl)ether dianhydride; 3,3',4,4'-benzophenone tetracarboxylic dianhydride; ethyleneglycol bistrimellitate dianhydride and a dianhydride having the formula

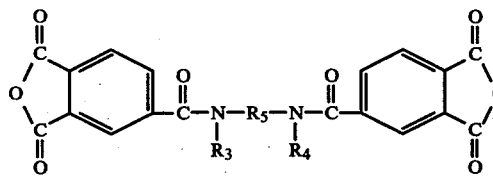

wherein $R_3$ or $R_4$ is hydrogen, an alkyl having from 1 to 12 carbon atoms, an aromatic or an alkyl substituted aromatic having from 6 to 20 carbon atoms; $R_5$ is an alkyl having from 2 to 12 carbon atoms, a cycloalkyl having from 4 to 15 carbon atoms, an aromatic, an alkyl substituted aromatic having from 6 to 20 carbon atoms, or an aromatic compound having the formula

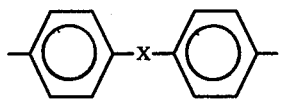

where X is O, $SO_2$, S, an alkyl having from 1 to 6 carbon atoms, C=O, or SO.

12. A process according to claim 11, wherein said conjugated dienes have from 4 to 12 carbon atoms, wherein said vinyl substituted aromatic compounds have from 8 to 20 carbon atoms, wherein said copolymer is made from dienes having from 4 to 12 carbon atoms and from vinyl substituted aromatics having from 8 to 20 carbon atoms; and polymerizing said imide-forming monomers at a temperature ranging from about 0° C. to about 200° C.

13. A process according to claim 11, wherein said anionically prepared homopolymer is made from monomers selected from the class consisting of conjugated dienes having from 4 to 12 carbon atoms and vinyl substituted aromatics having from 8 to 20 carbon atoms;

wherein said anionically prepared copolymer is made from monomers of conjugated dienes having 4 to 12 carbon atoms and vinyl substituted aromatics having from 8 to 20 carbon atoms; and polymerizing said imide forming monomers at a temperature ranging from about 0° C. to about 200° C.

14. A process according to claim 13, wherein said $R_2$ of said amide formula is hydrogen or an aromatic, and said amide formula compound wherein X is oxygen or sulfur is selected from the class consisting of formamide, acetamide, stearamide, oleamide, acetanilide, benzamide, benzanilide, thioformamide, thioacetamide, thiostearamide, thiooleamide, thioacetanilide, thiobenzamide, and thiobenzanilide;

wherein said lactam is caprolactam or capryllactam;

wherein said anionically prepared homopolymer is made from monomers selected from the class consisting of 1,3-butadiene, isoprene, vinyltoluene, styrene, alpha-methylstyrene, and 4-t-butylstyrene, and wherein said copolymer is a copolymer of styrene and butadiene;

wherein said equivalent ratio of said diamines to said dianhydrides ranges from about 1.05 to about 0.90; and wherein said dianhydrides are selected from the class consisting of pyromellitic dianhydride and benzophenone tetracarboxylic dianhydride and wherein said diamines are selected from the class consisting of bis(4-aminophenyl)ether, bis(4-aminophenyl)sulfide, meta-phenylenediamine, methylene dianiline, and para-phenylenediamine.

15. A process according to claim 14, wherein said polyisocyanate compound is selelcted from the class consisting of para-phenylene diisocyanate, meta-phenylene diisocyanate, diphenyl methane diisocyanates, dianisidine diisocyanates, isophorone diisocyanates, toluene diisocyanates, bitolylene diisocyanates, hexamethylene diisocyanate, and pentamethylene diisocyanate.

16. A process according to claim 12, wherein said imide block copolymer is cured.

* * * * *